(12) United States Patent
Moriyama

(10) Patent No.: US 9,039,042 B2
(45) Date of Patent: May 26, 2015

(54) STEERING APPARATUS

(75) Inventor: Seiichi Moriyama, Gunma (JP)

(73) Assignee: NSK LTD., Tokyo (JP)

( * ) Notice: Subject to any disclaimer, the term of this patent is extended or adjusted under 35 U.S.C. 154(b) by 32 days.

(21) Appl. No.: 13/810,805

(22) PCT Filed: Jun. 13, 2012

(86) PCT No.: PCT/JP2012/065126
§ 371 (c)(1),
(2), (4) Date: Feb. 27, 2013

(87) PCT Pub. No.: WO2012/173143
PCT Pub. Date: Dec. 20, 2012

(65) Prior Publication Data
US 2013/0205933 A1    Aug. 15, 2013

(30) Foreign Application Priority Data

Jun. 15, 2011 (JP) ................. 2011-132819
Sep. 22, 2011 (JP) ................. 2011-206810
Sep. 25, 2011 (JP) ................. 2011-208306
Feb. 21, 2012 (JP) ................. 2012-035139

(51) Int. Cl.
B62D 1/187 (2006.01)
B62D 1/189 (2006.01)
B62D 1/185 (2006.01)
B62D 1/184 (2006.01)

(52) U.S. Cl.
CPC ........... *B62D 1/187* (2013.01); *B62D 1/189* (2013.01); *B62D 1/185* (2013.01); *B62D 1/184* (2013.01)

(58) Field of Classification Search
CPC ........................... B62D 1/184; B62D 1/185

USPC ........................... 280/775; 74/493
See application file for complete search history.

(56) References Cited

U.S. PATENT DOCUMENTS

| 6,036,228 | A  | * | 3/2000  | Olgren et al. ........... 280/775 |
| 6,095,012 | A  | * | 8/2000  | Lutz ........................ 74/493 |
| 6,474,189 | B1 | * | 11/2002 | Koellisch et al. ....... 74/493 |
| 6,523,432 | B1 |   | 2/2003  | Yamamoto et al. |

(Continued)

FOREIGN PATENT DOCUMENTS

| EP | 1201526 A2 | * | 5/2002 | ........... B62D 1/189 |
| EP | 1332942 A2 |   | 8/2003 |

(Continued)

OTHER PUBLICATIONS

International Search Report dated Sep. 11, 2012 from the corresponding PCT/JP2012/065126.

(Continued)

*Primary Examiner* — Nicole Verley
(74) *Attorney, Agent, or Firm* — Katten Muchin Rosenman LLP

(57) ABSTRACT

Construction is achieved that is capable of maintaining the holding force by which a support bracket 12a holds an outer column 13a. One pivoting friction plate 25 for telescopic mechanism is held between the inside surface of a support plate section 20a of the support bracket 12a and the outside surface of a displacement bracket 18a that is fastened to the outer column 13a. When adjusting the forward-backward position of a steering wheel, the pivoting friction plate 25 for telescopic mechanism pivots around a support pin 33 as an adjustment rod 22a displaces along a long hole 19a for telescopic mechanism and a long guide hole 32.

3 Claims, 41 Drawing Sheets

(56) References Cited

U.S. PATENT DOCUMENTS

| | | | |
|---|---|---|---|
| 6,604,439 B2 * | 8/2003 | Gaukel | 74/493 |
| 6,662,674 B2 * | 12/2003 | Cartwright et al. | 74/493 |
| 6,766,712 B2 * | 7/2004 | Koellisch et al. | 74/493 |
| 6,829,962 B2 * | 12/2004 | Cartwright | 74/493 |
| 6,863,305 B2 * | 3/2005 | Hobaugh, II | 280/775 |
| 6,923,086 B2 * | 8/2005 | Muller | 74/493 |
| 7,207,236 B2 * | 4/2007 | Muller | 74/493 |
| 7,775,137 B2 * | 8/2010 | Arbanas et al. | 74/493 |
| 8,523,227 B2 * | 9/2013 | Roach | 280/775 |
| 8,596,684 B2 * | 12/2013 | Ridgway et al. | 280/777 |
| 8,746,740 B2 * | 6/2014 | Tanaka | 280/777 |
| 2002/0178857 A1 | 12/2002 | Matsumiya | |
| 2004/0134301 A1 * | 7/2004 | Ko et al. | 74/492 |
| 2004/0134302 A1 | 7/2004 | Ko et al. | |
| 2004/0155448 A1 * | 8/2004 | Klukowski et al. | 280/777 |
| 2005/0104353 A1 | 5/2005 | Ikeda et al. | |
| 2006/0090587 A1 * | 5/2006 | Kanzler et al. | 74/493 |
| 2007/0068311 A1 * | 3/2007 | Shimoda et al. | 74/493 |
| 2008/0042420 A1 * | 2/2008 | Ali et al. | 280/775 |
| 2008/0087129 A1 * | 4/2008 | Kaneko et al. | 74/493 |

FOREIGN PATENT DOCUMENTS

| | | | | | |
|---|---|---|---|---|---|
| EP | 1435317 | A2 | | 7/2004 | |
| GB | 2092966 | A | * | 8/1982 | B62D 1/18 |
| GB | 2306629 | A | * | 5/1997 | B62D 1/18 |
| GB | 2377471 | A | | 1/2003 | |
| GB | 2381853 | A | * | 5/2003 | B62D 1/18 |
| JP | 02225176 | A | * | 9/1990 | B62D 1/18 |
| JP | 02249761 | A | * | 10/1990 | B62D 1/18 |
| JP | 02303971 | A | * | 12/1990 | B62D 1/18 |
| JP | 03067779 | A | * | 3/1991 | B62D 1/18 |
| JP | 03067780 | A | * | 3/1991 | B62D 1/18 |
| JP | 10-35511 | A | | 2/1998 | |
| JP | 2000-289628 | | | 10/2000 | |
| JP | 2001-80527 | | | 3/2001 | |
| JP | 2002-362377 | | | 12/2002 | |
| JP | 2003-276614 | | | 10/2003 | |
| JP | 2004-034884 | | | 2/2004 | |
| JP | 2004-210264 | | | 7/2004 | |
| JP | 2005-343331 | A | | 12/2005 | |
| JP | 2005-343333 | A | | 12/2005 | |
| JP | 2005-537983 | | | 12/2005 | |
| JP | 2008-143396 | | | 6/2008 | |
| JP | 2008-149969 | | | 7/2008 | |
| JP | 2010-52639 | A | | 3/2010 | |
| JP | 2010-173552 | A | | 8/2010 | |
| JP | 2011-84133 | A | | 4/2011 | |
| JP | H-114476 | | | 8/2014 | |
| WO | 2004/024534 | | | 3/2004 | |
| WO | 2006/118054 | A1 | | 11/2006 | |

OTHER PUBLICATIONS

Japanese Office Action dated Dec. 17, 2013, from the corresponding JP2011-206810.

Japanese Office Action dated Sep. 3, 2013, from the corresponding JP2012-035139.

Japanese Office Action dated Sep. 25, 2014, from the corresponding JP2013-270038.

Japanese Office Action dated Sep. 24, 2014, from the corresponding JP2013-270040.

Japanese Office Action dated Sep. 24, 2014, from the corresponding JP2013-270039.

Extended European Search Report dated Mar. 30, 2015 for the Corresponding European Patent Application No. 12801315.8.

* cited by examiner

STEERING APPARATUS

TECHNICAL FIELD

The present invention relates to a steering apparatus for an automobile that comprises a tilt mechanism and/or a telescoping mechanism for adjusting the up-down position or the forward-backward position of the steering wheel.

BACKGROUND ART

As illustrated in FIG. 41, a steering apparatus for an automobile is constructed such that rotation of the steering wheel 1 is transmitted to an input shaft 3 of a steering gear unit 2, and as the input shaft 3 rotates, pushes or pulls a pair of left and right tie rods 4, which applies a steering angel to the front wheels. The steering wheel 1 is supported by and fastened to the rear end section of a steering shaft 5, and the steering shaft 5 is inserted in the axial direction through a cylindrical steering column 6 and is supported by the steering column 6 so as to be able to rotate freely. Moreover, the front end section of the steering shaft 5 is connected to the rear end section of an intermediate shaft 8 by way of a universal joint 7, and the front end section of the intermediate shaft 8 is connected to the input shaft 3 by way of another universal joint 9. In this specification, unless specially indicated, the forward-backward direction, left-right direction and up-down direction, are the forward-backward direction, the left-right direction and the up-down direction of the vehicle.

This steering apparatus is provided with a tilt mechanism for adjusting the up-down position (tilt position) and a telescoping mechanism for adjusting the forward-backward position (telescopic position) of the steering wheel 1 according to the size and driving posture of the driver, which has conventionally been performed. Of these, in order to construct this tilt mechanism, the steering column 6 is supported by the vehicle 10 so as to be able to pivotally displace around a pivot shaft 11 that is placed in the left-right direction. Moreover, a displacement bracket 18 that is fastened to a portion near the rear end of the steering column 6 is supported by a support bracket 12 that is supported by the vehicle 10 so as to be able to displace in the up-down direction and forward-backward direction. On the other hand, in order to construct the telescopic mechanism, the steering column 6 is constructed by combining an outer column 13 and an inner column 14 in a telescopic shape so as to be able to expand and contract freely, and the steering shaft 5 is constructed by combining an outer shaft 15 and an inner shaft 16 with a spline fit so as to be able to transmit torque and so as to be able to expand and contract freely. In the example in the figure, an electric power-steering apparatus is also assembled in which an electric motor 17 as an auxiliary power source is able to reduce the force necessary for operating the steering wheel 1.

In the case of construction of a manual tilt mechanism and telescopic mechanism which is not equipped with an electrically-operated apparatus, it is possible to adjust the position of the steering wheel and to secure the steering wheel 1 after adjustment based on operation of an adjustment handle. Various kinds of construction for this kind of manual tilt mechanism or telescoping mechanism are known. For example, in the case of the construction illustrated in FIG. 41, long holes 19 for telescopic mechanism that are long in the axial direction of the outer column 13 are formed in the displacement bracket 18 to which the outer column 13 is fastened. Moreover, the support bracket 12 comprises a pair of support plate sections 20 that hold the displacement bracket 18 on both the left and right sides, and long holes 21 for tilt mechanism that are long in the up-down direction are formed in portions of these support plate sections 20 that are aligned with each other. In general, the long holes 21 for tilt mechanism have a partial arc shape that is centered around a pivot shaft 11. An adjustment rod 22 is inserted through the long holes 19 for telescopic mechanism and the long holes 21 for tilt mechanism. A pair of pressing sections are provided on the adjustment rod 22 such that they are located on both the left and right sides of the pair of support plate sections 20, and an expansion and contraction mechanism that operates based on the operation of the adjustment handle 23 (see FIG. 1 to FIG. 3) makes it possible to expand or contract the space between these pressing sections.

When adjusting the up-down position or the forward-backward position of the steering wheel 1, by turning the adjustment handle 23 in a specified direction, the space between the pair of pressing sections is expanded. As a result, the friction force that acts between the inside surfaces of the pair of support plate sections 20 and the outside surfaces of both the left and right sides of the displacement bracket 18 is reduced. In this state, the tilt position and the telescopic position of the steering wheel 1 can be adjusted within the range that the adjustment rod 22 can displace within the long holes 19 for telescopic mechanism and the long holes 21 for tilt mechanism. After adjustment, by turning the adjustment handle 23 in the opposite direction from the specified direction, the space between the pair of pressing sections is contracted. As a result, the friction force is increased, and it becomes possible to maintain the steering wheel 1 in the adjusted position.

In this kind of steering apparatus, during a collision accident, when a secondary collision occurs where the body of the driver collides with the steering wheel 1, in order to lessen the impact load on the driver, a mechanism is provided that allows the steering wheel 1 to displace in the forward direction. More specifically, construction is employed wherein the support bracket 12 is supported by the vehicle 10 so that it can break away in the forward direction due to impact during a secondary collision. In the case of a steering apparatus with this kind of construction, when the force for maintaining the steering wheel 1 in the adjusted position, or in other words, the force for maintaining the outer column 13 in the support bracket 12 is weak, there is a possibility that the outer column 13 will move in the forward-backward direction (telescopic direction) or the up-down direction (tilt direction) with respect to the support bracket. When the outer column 13 moves with respect to the support bracket 12, how the impact from the outer column 13 is applied to the support bracket 12 changes, so there is a possibility that designing the impact absorbing mechanism in order that the support bracket 12 breaks away from the vehicle 10 will become difficult.

On the other hand, in order to increase the force by which the support bracket 12 holds the outer column 13 without increasing the operating amount or operating force of the adjustment handle, preferably the number of friction surfaces for maintaining the holding force is increased. JP 10-35511 (A) discloses construction where the number of friction plates is increased by combining in a friction plate that is supported by the steering column and a friction plate that is supported by the support bracket. However, in this kind of construction, the friction plates are supported by the steering column or support bracket such that only displacement in the left-right direction is allowed. Consequently, in order to increase the number of friction surfaces, a plurality of friction plates is necessary. Therefore, as the number of friction surfaces increases, the increase in the resulting dimension in the left-right direction, the number of parts and the weight becomes large.

JP 2010-52639 (A) discloses construction for preventing displacement of the steering column in the upward rear direction along the direction of inclination of the long holes for tilt mechanism during a secondary collision by increasing the inclination angle of the long holes for tilt mechanism with respect to an virtual plane that is orthogonal to the center axis of the steering column so that it is greater than the inclination angle of the long holes for tilt mechanism with respect to the forward-backward direction of the center axis of the steering column regardless of the up-down position of the steering wheel.

RELATED LITERATURE

Patent Literature

[Patent Literature 1] JP 10-35511 (A)
[Patent Literature 2] JP 2010-52639 (A)

SUMMARY OF THE INVENTION

Problem to be Solved by the Invention

The object of the present invention is to provide a steering apparatus that is capable of adequately maintaining the force by which the support bracket holds the outer column.

Means for Solving the Problems

The steering apparatus of the present invention comprises: a steering column, a displacement bracket, first through holes, a support bracket, second through holes, an expansion and contraction apparatus, a pivoting friction plate and a support pin.

The steering column is located around a steering shaft to which a steering wheel is fastened to the rear end section thereof, and supports the steering shaft so as to be able to rotate freely.

The displacement bracket is fastened to the middle section in the axial direction of the steering column. This displacement bracket can be integrally formed with the steering column, or can be a separate member from the steering column and fastened to the steering column.

The first through holes are formed in the left-right direction in the displacement bracket. The support bracket is supported by the vehicle, and has a pair of support plate sections that are provided so as to be on both the left and right sides of the displacement bracket. Furthermore, the second through holes are formed in part of the pair of support plate sections at positions that are aligned with each other.

The expansion and contraction apparatus comprises: an adjustment rod; an adjustment handle that is provided on the portion of one end section of the adjustment rod that protruded from the outside surface of one of the pair of support plate sections; and a pair of pressing sections that are provided on parts of the adjustment rod at positions on both the left and right surface sides of the pair of support plate sections. The expansion and contraction apparatus is capable of expanding or contracting a space between the pair of pressing sections based on the operation of the adjustment handle.

The pivoting friction plate is held in at least one of portions located between the inside surfaces of the pair of support plate sections and the outside surfaces of both sides of the displacement bracket and a portion situated between the outside surfaces of the pair of support plate sections and the inside surfaces of the pair of the pressing sections, the above portions corresponding to a portion located between a pair of surfaces that face each other. These pivoting friction plates have a pivot hole and a long guide hole formed therein at two locations that are separated from each other.

The support pin is provided in a part of one of the pair of surfaces that hold the pivoting friction plates that displaces relative to the adjustment rod when performing position adjustment of the steering wheel, or in a portion that does not move with respect to this one surface, and that engages with the pivot hole.

At least one of the first through holes and second through holes constitute long adjustment holes (long holes for telescopic mechanism or long holes for tilt mechanism) that are long in the position adjustment direction of the steering wheel. The adjustment rod is inserted through the first through holes, second through holes and the long guide holes.

In the steering apparatus of the present invention that is constructed as described, when the surface pressure at areas of contact between the surfaces on the left and right sides of the pivoting friction plate and the pair of surfaces that hold the pivoting friction plate is decreased or lost by expanding the space between the pair of pressing sections, and when the adjustment rod is displaced along the long adjustment holes, the pivoting friction plate pivots around the support pin while the adjustment rod displaces along the long guide holes. The steering apparatus is constructed such that, over the entire pivoting range, the lengthwise direction of the long guide hole or the tangential direction of a portion of the long guide hole that the guide pin engages with, and the lengthwise direction of the long adjustment hole or the tangential direction of a portion of the long adjustment hole through which the adjustment rod is inserted do not coincide.

Preferably, the first through holes are long holes for telescopic mechanism that are long in the axial direction of the steering column, and when the adjustment rod is caused to displace along the long holes for telescopic mechanism, the pivoting friction plate that is held in at least one of the portions located between the pairs of surfaces pivots around the support pin as the adjustment rod displaces along the long guide hole, and, over the entire pivoting range, the lengthwise direction of the long guide hole or the tangential direction of the portion of the long guide hole that the adjustment rod engages with does not coincide with the lengthwise direction of the long holes for telescopic mechanism (axial direction of the steering column).

Alternatively or additionally, the second through holes are long holes for tilt mechanism that are long in the up-down direction, and when the adjustment rod is caused to displace along the long holes for tilt mechanism, the pivoting friction plate that is held in at least one of the portions located between the pair of surfaces pivots around the support pin as the adjustment rod displaces along the long guide holes, and, over the entire range of pivoting, the lengthwise direction of the long guide hole or the tangential direction of a portion of the long guide hole that the adjustment rod engages with does not coincide with the lengthwise direction of the long holes for tilt mechanism or the tangential direction of portions of the long holes for tilt mechanism through which the adjustment rod is inserted.

The long guide hole can be formed in a linear shape that extends along a straight line that connects the adjustment rod and the support pin, or can be formed in an arc shape that extends along an arc that connects the adjustment rod and the support pin.

Alternatively, the long guide hole can be formed in a linear shape that is inclined with respect to a straight line that connects the adjustment rod and the support pin, or can be formed in an arc shape that is inclined with respect to an arc that connects the adjustment rod and the support pin.

Preferably, by providing a long strength adjustment hole, which is parallel with the long guide hole, in a portion of the pivoting friction plate that is separated from the edge of one side of the edges on both sides in the width direction of the long guide hole where a devastating pressing force is applied from the adjustment rod during the occurrence of a secondary collision, toward the one side in the width direction of the long guide hole, a bridge section that is plastically deformable in a direction toward the side of the long strength adjustment hole due to the devastating pressing force is formed.

Preferably, the pivoting friction plate is made of different metallic material in hardness from at least one of a member that comprises one of the pairs of surfaces that hold the pivoting friction plate and a member that comprises the other surfaces.

Preferably, the pivoting friction plate is finished with surface treatment for increasing the friction coefficient, and more specifically, the surface treatment is performed in order to make the friction coefficient 0.15 or greater. Moreover, preferably, the pivoting friction plate is formed using iron, an iron alloy, aluminum or an aluminum alloy.

Effect of the Invention

In the case of the steering apparatus of the present invention, when maintaining the steering wheel in an adjusted position, in order to generate a force by which the support bracket holds the steering column, or in other words, in order to generate a force in the support bracket that suppresses displacement of the steering column in the adjustment direction of the steering wheel, in a state where the space between the pair of pressing sections is narrowed, the areas of contact between the side surfaces of both sides of pivoting friction plates and the pair of surfaces that hold these pivoting friction plates effective function as friction surfaces for maintain the holding force.

In other words, in the case of the present invention, on order to cause the steering column to displace in the position adjustment direction with respect to the support bracket, it is necessary to cause the adjustment rod to displace along the long adjustment holes (long holes for telescopic mechanism or long holes for tilt mechanism). Moreover, in order to cause the adjustment rod to displace along the long adjustment holes in this way, it is necessary to cause the pivoting friction plates to pivot around the support pin, while causing the adjustment rod to displace along the long guide holes. However, in the case of the present invention, by narrowing the space between a pair of pressing sections, the surface pressure at the areas of contact between the side surfaces on both sides of the pivoting friction plates and a pair of surfaces that hold the pivoting friction plates is increased, and in this state, pivoting of the pivoting friction plates around the support pin is suppressed by the friction force acting at these areas of contact. Particularly, in the case of the present invention, in order to cause the pivoting friction plates to pivot around the support pin, causing sliding at only one of the areas of contact between the side surfaces of both side of the pivoting friction plates and the pair of surfaces that hold the pivoting friction plates is insufficient, and it is necessary to cause sliding both of the areas of contact. Therefore, both of the areas of contact effectively function as friction surfaces for maintaining the force by which the support bracket holds the steering column.

In the case of the present invention, by causing direct contact between the pair of surfaces holding the pivoting friction plates in this way, when compared with construction in which the areas of contact between these surfaces are the friction surfaces by bringing these surfaces into direct contact with each other, it is possible to increase the number of friction surface one at a time. As a result, it is possible to improve the holding force by which the support bracket holds the steering column. Particularly, in the case of the present invention, it is possible to increase the number of friction surfaces by simply place one pivoting friction plate between the pair of surfaces. Therefore, it is possible to sufficiently suppress increases in the dimension in the left-right direction, the number of parts and the weight that occur due to increasing the friction surfaces.

Moreover, in the case of the present invention, there is a tendency during a secondary collision for the pivoting friction plates to be compressed and bent in the axial direction of the steering column between the areas of contact between the side surfaces on both sides of the pivoting friction plates and the pair of surfaces that hold the pivoting friction plates and the support pin. As a result, there is a tendency for the thickness dimension of the pivoting friction plates to become thicker, and for the pressing force between the pressing sections to increase. By just obtaining this kind of effect, it is possible to maintain the holding force by which the support bracket holds the steering column.

Furthermore, with the preferred form of the present invention, when a secondary collision occurs, as the bridge sections that are provided in the pivoting friction plates plastically deform, the edge on one side in the width direction of the long guide holes that are provided in the pivoting friction plates deforms. As a result, the angle between the lengthwise direction or tangential direction of the portion of the edge on one side in the width direction of the long guide holes and the lengthwise direction or tangential direction of the portion of the long adjustment holes through which the adjustment rod is inserted increases. As a result, the force for preventing displacement of the adjustment rod along the long adjustment holes, which is caused by the engagement between the edge on the one side in the width direction of the long guide holes and the guide pin, increases. Therefore, when a secondary collision occurs, it is possible to further increase the holding force by which the support bracket holds the steering column.

With another form of the present invention, at least one of the areas of contact between the side surfaces on both sides of the pivoting friction plates and the pair of surface that holes the pivoting friction plates is an area of contact between surfaces having different hardness. Therefore, as a secondary collision occurs, the surface on the harder side bites into the surface on the softer side, making it difficult for sliding to occur at that area of contact. Therefore, it is possible to increase the holding force by which the support bracket holds the steering column by the amount of this effect.

MODES FOR CARRYING OUT THE INVENTION

Figure 1:
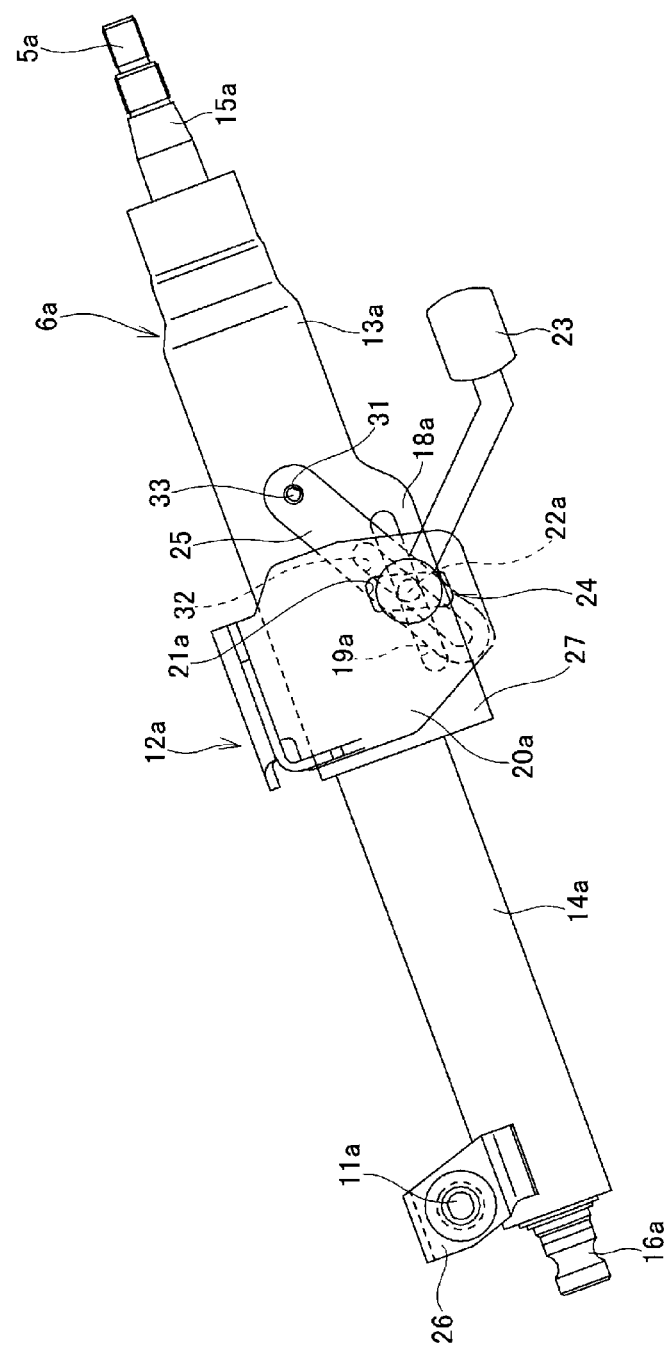
FIG. 1 is a side view illustrating a first example of an embodiment of the present invention.
Figure 2:
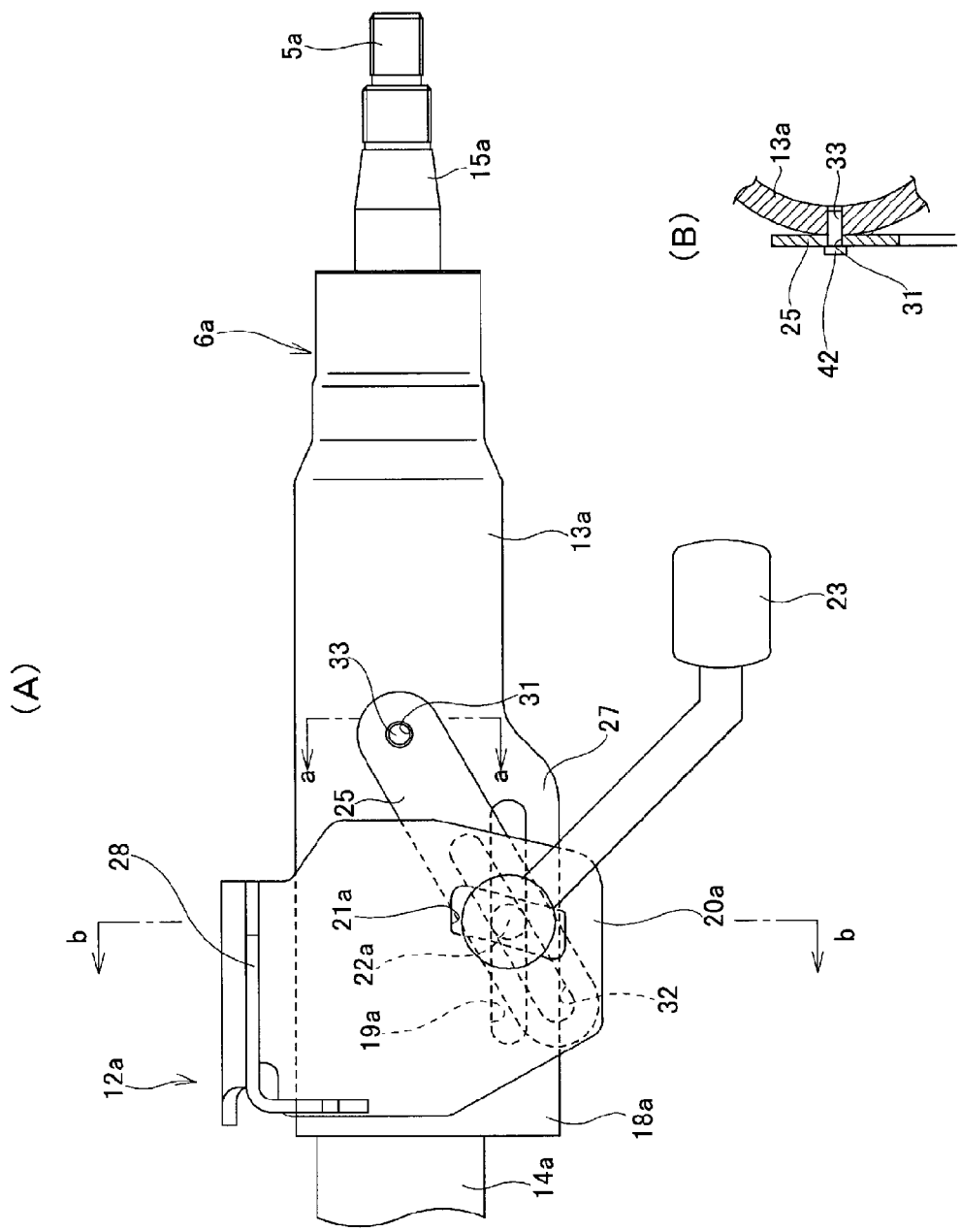
FIG. 2A is an enlarged view of the right half of FIG. 1.
FIG. 2B is a cross-sectional view of section a-a in FIG. 2A.
Figure 3:
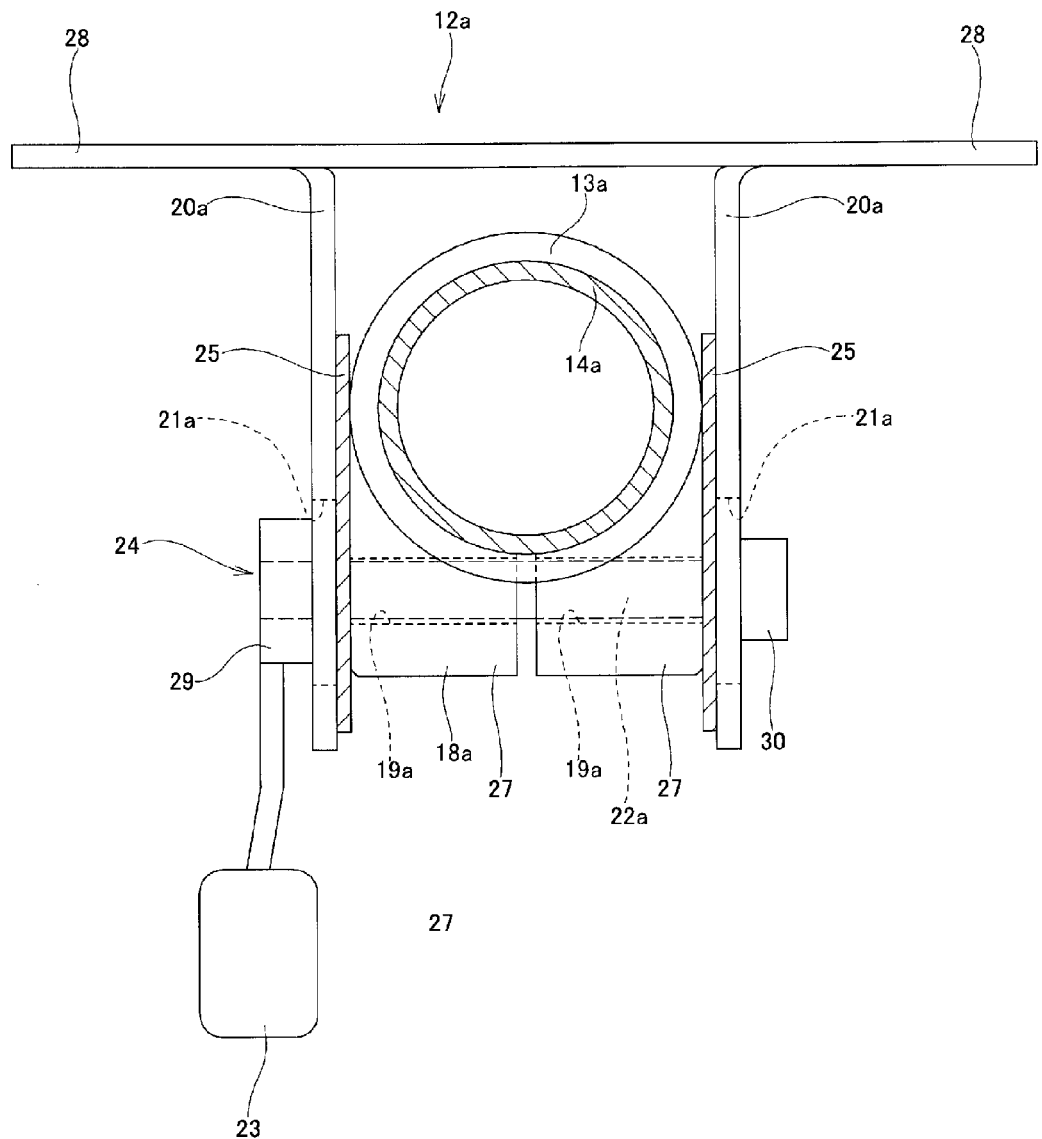
FIG. 3 is a cross-sectional view of section b-b in FIG. 2A.
Figure 4:
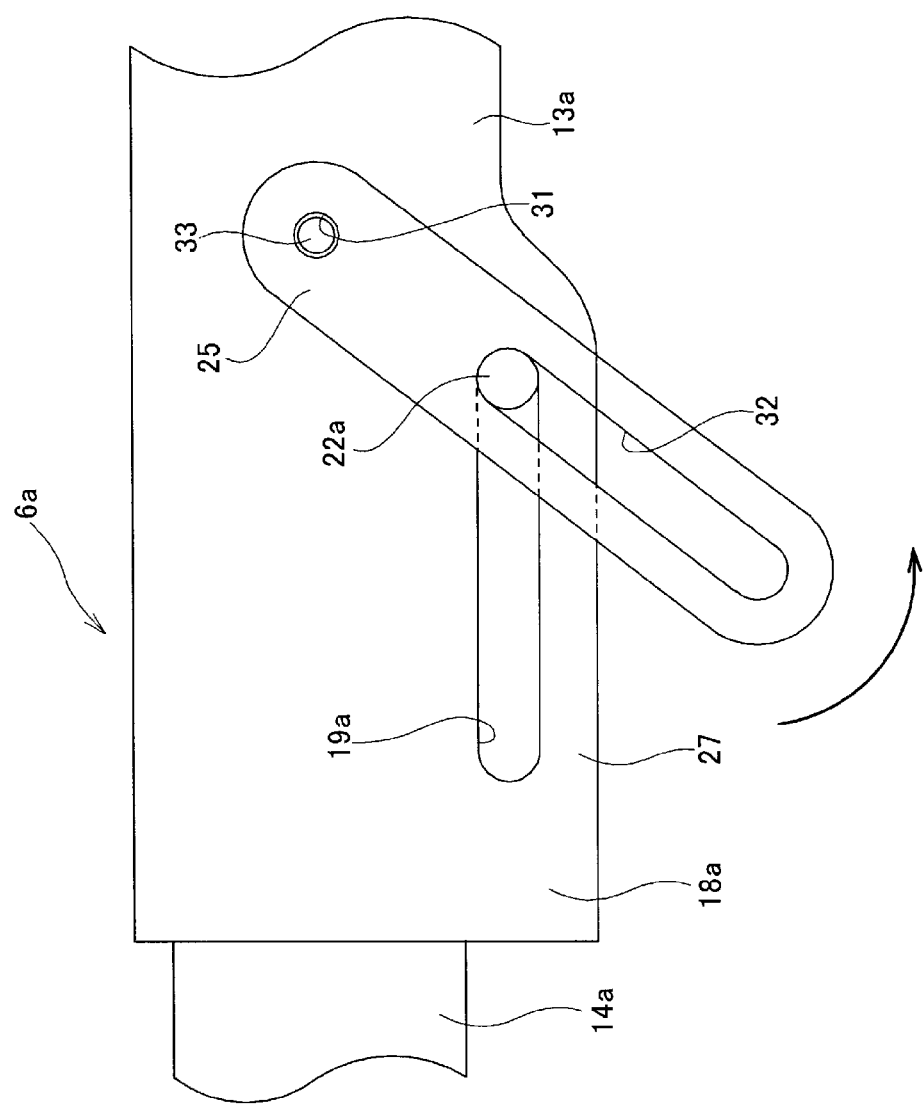
FIG. 4 is a drawing corresponding to the left half in FIG. 2A and illustrates a state in which the adjustment rod is located in the rear end section of the long holes for telescopic mechanism, with part of the members omitted.
Figure 5:
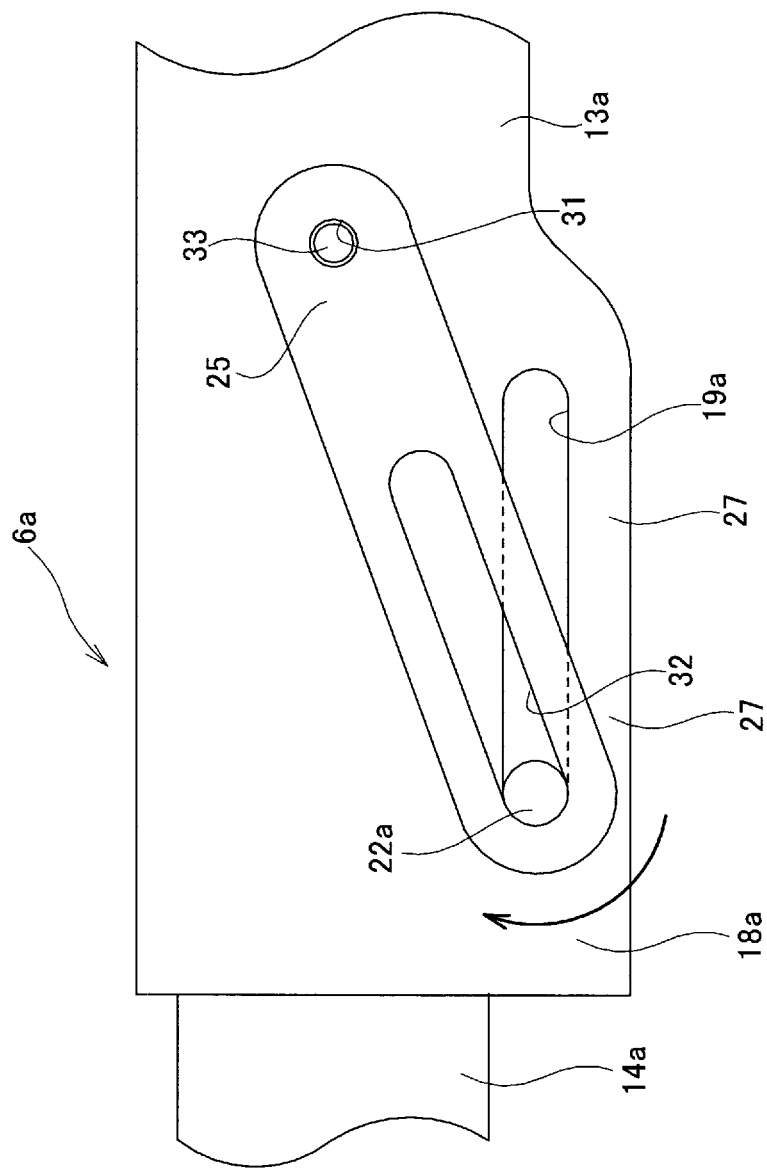
FIG. 5 is drawing similar to FIG. 4 and illustrates a state in which the adjustment rod is located in the front end section of the long holes for telescopic mechanism.

The steering apparatus of the present invention will be explained with reference to the drawings. A feature of the steering apparatus of the present invention is construction for holding the outer column by the support bracket. Therefore, here, the features of that construction will be explained in detail, and unless specially indicated, as the basic construction of the steering apparatus, including the telescoping mechanism, tilt mechanism and mechanism for allowing the support bracket to break away from the vehicle, the known construction can be adopted, and the same function and effect can be obtained.

Example 1

FIG. 1 to FIG. 5 illustrate a first example of an embodiment of the present invention. The steering apparatus of this example comprises a steering column 6a, a steering shaft 5a, a long holes 19a for telescopic mechanism, a support bracket 12a, long holes 21a for tilt mechanism, expansion and contraction apparatus 24, and a pair of telescopic pivoting friction plates 25.

Figure 41:
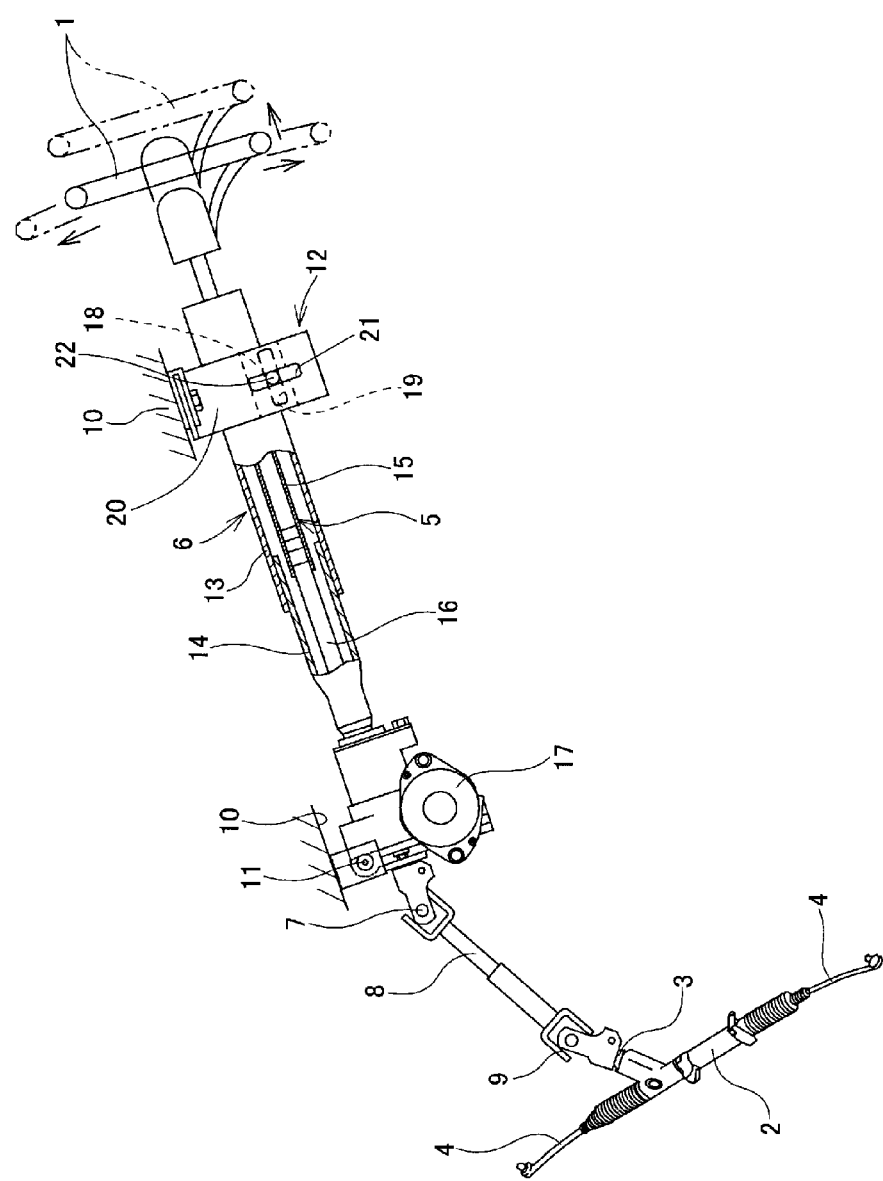
FIG. 41 is a side view with part cut away, and illustrates an example of a conventional steering apparatus.

The steering column 6a is constructed such that the front end section of an outer column 13a that is located on the rear side, and the rear end section of an inner column 14a that is located on the front side are fitted together so that relative displacement in the axial direction is possible, and such that the entire length can be expanded or contracted. The steering shaft 5a is supported on the inside of the steering column 6a so as to be able to rotate freely. The steering shaft 5a is constructed by the front end section of a circular pipe shaped outer shaft 15a that is located on the rear side and the rear end section of an inner shaft 16a that is located on the front side being fitted together with a spline fit so as to be able to transmit torque and so that the entire length can be expanded or contracted. The portion of the outer shaft 15a near the rear end of the middle section is supported on the inside of the rear end section of the outer column 13a, and the portion of the inner shaft 16a near the front end of the middle section is supported on the inside of the front end section of the inner column 14a, with each being supported by bearings such as single-row deep-groove ball bearings that are capable of supporting a radial load and an axial load so that they can rotate freely. A steering wheel 1 (see FIG. 41) is fastened to the portion of the rear end section of the outer shaft 15a that protrudes from the opening on the rear end of the outer column 13a. A pivotal support bracket 26 is welded and fastened to the top surface of the front end section of the inner column 14a, and this pivotal support bracket 26 is supported by the vehicle 10 (see FIG. 41) by a pivot shat 11a that is arranged in the left-right direction so as to be able to pivotally displace in the up-down direction.

A displacement bracket 18a is fastened to the front half of the outer column 13a, which is the middle section in the axial direction of the steering column 6a, so as to protrude downward from the outer column 13a. In this example, the outer column 13a is formed by die casting a light alloy such as an aluminum alloy or magnesium alloy, and is integrally formed with the displacement bracket 18a. Alternatively, the outer column 13a can be obtained by welding the displacement bracket 18a to a steel pipe. The displacement bracket 18a is composed of a pair of held plate sections 27 that are separated in the left-right direction. Long holes 19a for telescopic mechanism that are long in the axial direction of the outer column 13a are formed in positions in the pair of held plate sections 27 that are aligned with each other, such that they pass through in the left-right direction. The displacement bracket 18a described above can also be provided so at to protrude upward from the steering column 6a.

The support bracket 12a is formed by joining and fastening together into one piece a plurality of elements that are made of a metal plate having sufficient strength and rigidity such as a steel plate, and comprises a pair of left and right installation plate sections 28 and a pair of left and right support plate sections 20a. Using known construction in the technical field of steering apparatuses, the installation plate sections 28 of the support bracket 12a are supported by the vehicle 10 so as to be able to break away in the forward direction due to impact during a secondary collision. Moreover, the support plate sections 20a are arranged so as to be on both the left and right sides of the displacement bracket 18a. Long holes 21a for tilt mechanism that are long in the up-down direction are formed in positions on part of the support plates 20a that are aligned with each other and that are aligned with part of the long holes 19a for telescopic mechanism. In this example, the long holes 21a for tilt mechanism have a partial arc shaped that is centered at the pivot shaft 11a. The steering apparatus of this example, can be constructed so as to comprise only a telescopic mechanism by providing circular holes in the support plate sections 20a instead of the long holes 21a for tilt mechanism that are long in the up-down direction.

The expansion and contraction apparatus 24 comprises an adjustment rod 22a, an adjustment nut 29, and an adjustment handle 23. In this example, the adjustment rod 22a is inserted from the right in FIG. 3 through the long holes 19a for telescopic mechanism and the long holes 21a for tilt mechanism. The adjustment nut 29 is screwed onto male thread section on the tip end section of the adjustment rod 22a that protrudes from one of the support plate sections 20a (left support plate section in FIG. 3). In this state, a head section 30 that is provided on the base end section of the adjustment rod 22a engages with the long hole 21a for tilt mechanism that is formed in the other support plate section 20a (right support plate section in FIG. 3) so that displacement is only possible in the lengthwise direction of the long holes 21a for tilt mechanism. The base end section of the adjustment handle 23 is fastened to the adjustment nut 29. By turning the adjustment handle 23 and changing the screwed amount of the male thread section with respect to the adjustment nut 29, it is possible to cause the space between the adjustment nut 29 and the head section 30, which form a pair of pressing sections, to expand or contract. Alternatively, as an expansion and contraction apparatus, it is possible to provide a cam apparatus on the base end section or tip end section of the adjustment rod that is able to cause the dimension in the axial direction to expand or contract based on the operation of the adjustment handle.

The pair of pivoting friction plates 25 for telescopic mechanism are constructed by elliptical flat plate members that are made using a metal plate such as iron, an iron-based alloy, aluminum, an aluminum alloy and the like. Preferably, the pivoting friction plates 25 for telescopic mechanism are made using a metal plate that is different than the steel plate of the support bracket 12a. The pivoting friction plates 25 for telescopic mechanism have a pivot hole 31 on the same end in the lengthwise direction, and have a straight long guide hole 32 that extends from the middle section to the other end section in the lengthwise direction. The pivoting friction plates 25 for telescopic mechanism are held in the portion between the inside surfaces of the support plates 20a and the outside surfaces of the displacement bracket 18a. In this state, the adjustment rod 22a is inserted through the long guide holes 32 so as to be able to displace along the long guide holes 32, and a support pins 33 that are formed such that they protrude from the side surfaces of both side of the middle section of the outer column 13a fits in the pivot holes 31 so that only pivotal displacement of the pivoting friction plates 25 for telescopic mechanism is possible around these support pins 33. In this example, the long guide holes 32 are formed so as to be straight along the straight line that connects the adjustment rod 22a and the support pin 33.

In this example, the support pins 33 are provided on and protrude from the portions of the side surfaces of both sides of the middle section of the outer column 13a that are further toward the rear and top than the long holes 19a for telescopic mechanism and that are always located toward the rear than the support plate sections 20a regardless of the position where the steering wheel 1 is adjusted. Furthermore, as illustrated in FIG. 2B, a stopper head section 42, that has an outer diameter dimension that is larger than the inner-diameter dimension of the pivot hole 31 is provided on the portion of the tip end section of each of the support pins 33 that protrudes from the pivot hole 31. The support pins 33 can also be provided on portions of the side surfaces of both sides of the middle section of the outer column 13a that are further toward the front than the long holes 19a for telescopic mechanism and that are always located toward the front than the support plate sections 20a regardless of the position where the steering wheel 1 is adjusted. In this case, the displacement bracket 18a is provided in the middle or the rear half section of the outer column 13a. In this example, the support pins 33 are provided on the center axis line of the steering column 6a. However, it is also possible to provide the support pins 33 above or below the center axis line of the steering column 6a.

In this example, when adjusting the up-down or forward-backward position of the steering wheel 1, the space between the adjustment nut 29 and the head section 30 of the adjustment rod 22a is expanded by turning the adjustment handle 23 in a specified direction (typically downward). As a result, by elastically expanding the space between the pair of held plate sections 27 of the displacement bracket 18a, the inner diameter of the front end section of the outer column 13a is elastically expanded, which causes the surface pressure at the area of engagement between the inner circumferential surface of the front end section of the outer column 13a and the outer circumferential surface of the rear end section of the inner column 14a to decrease or be lost. At the same time, the surface pressure at the area of contact between the inside surfaces of the support plate sections 20a and the outside surfaces of the displacement bracket 18a, and the surface pressure at the area of contact between the outside surfaces of the support plate sections 20a and the inside surface of the adjustment nut 29 and the inside surface of the head section 30 to decrease or be lost. In this state, it is possible to adjust the position of the steering wheel 1 within the range that the adjustment rod 22a can displace inside the long holes 19a for telescopic mechanism and the long holes 21a for tilt mechanism.

Particularly, in this example, when the outer column 13a is made to displace in the forward-backward direction within a range that the adjustment rod 22a is able to displace within the long holes 19a for telescopic mechanism in order to adjust the forward-backward position of the steering wheel 1, the pivoting friction plates 25 for telescopic mechanism pivot around the support pins 33. In other words, when the outer column 13a is caused to displace in the forward direction from the state illustrated in FIG. 5 to the state illustrated in FIG. 4, the adjustment rod 22a displaces along the long holes 19a for telescopic mechanism and the long guide holes 32, and the pivoting friction plates 25 for telescopic mechanism pivot and displace in the counterclockwise direction in FIG. 4 and FIG. 5 around the support pins 33. As a result, there is relative displacement between the adjustment rod 22a and the support pin 33 toward each other. On the other hand, when the outer column is caused to displace in the backward direction, the adjustment rod 22a displaces along the long holes 19a for telescopic mechanism and long guide holes 32 from the state illustrated in FIG. 4 to the state illustrated in FIG. 5, and the pivoting friction plates 25 for telescopic mechanism pivot and displace in the clockwise direction in FIG. 4 and FIG. 5 around the support pins 33. As a result, there is relative displacement between the adjustment rod 22a and the support pins 33 in a direction away from each other. Moreover, in this example, over the entire pivot range, the lengthwise direction of the long guide holes 32 and the lengthwise direction of the long holes 19a for telescopic mechanism are not parallel and do not coincide with each other.

After the position of the steering wheel 1 has been adjusted, by turning the adjustment handle 23 in a direction opposite the specified direction (typically upward), the space between the adjustment nut 29 and the head section 30 contracts. As a result, the surface pressure at the area of contact between the outside surfaces of the support plate sections 20a and the inside surface of the adjustment nut 29 and the inside surface of the head section increases, and maintains the steering wheel 1 in the adjusted position.

In the case of a steering apparatus constructed in this way, when maintaining the steering wheel 1 in the adjusted position, in order to generate the holding force by which the support bracket 12a holds the outer column 13a, or in other words, the force for suppressing displacement of the outer column 13a with respect to the support bracket 12a in the position adjustment direction of the steering wheel 1, the space between the adjustment nut 29 and the head section 30 is narrowed, and the area of contact between the side surfaces of both sides of the pivoting friction plates 25 for telescopic mechanism and the inside surfaces of the support plate sections 20a and the outside surfaces of both sides of the displacement bracket 18a effectively function as friction surfaces for maintaining the holding force by which the support bracket 12a holds the outer column 13a, and particularly the holding force in the forward-backward direction (axial direction of the outer column 13a).

In other words, in this example, in order to cause the outer column 13a to displace in the forward-backward direction with respect to the support bracket 12a, it is necessary to cause the adjustment rod 22a to displace along the long holes 19a for telescopic mechanism. In order to cause the adjustment rod 22a to displace along the long holes 19a for telescopic mechanism, it is necessary to cause the adjustment rod 22a to displace along the long guide holes 32, and to cause the pivoting friction plates 25 for telescopic mechanism to pivot around the support pins 33. Therefore, in a state where the space between the adjustment nut 29 and the head section 30 is narrowed, and the surface pressure at the areas of contact for the inside surfaces of the support plate sections 20a and the outside surfaces of the displacement bracket 18a is increased, displacement of the adjustment rod 22a along the long guide holes 32 is suppressed by the friction force that act on these areas of contact. Particularly, in this example, in order to cause the adjustment rod 22a to displace along the long guide holes 32, it is necessary to generate slippage at both areas of contact between the side surfaces of both sides of the pivoting friction plates 25 for telescopic mechanism and the inside surfaces of the support plate sections 20a and the outside surfaces of the displacement bracket 18a, because generating slippage at only one of these areas of contact is not sufficient. Therefore, both of these areas of contact effectively function as friction surfaces for maintaining the holding forces in the forward-backward direction.

When compared with the case wherein the inside surfaces of the support plate sections 20a come in direct contact with the outside surfaces of the displacement bracket 18a, and the areas of contact between these surfaces function as friction surfaces, in this example it is possible to increase the number of friction surfaces one at a time at each installation location of the pivoting friction plates 25 for telescopic mechanism. As a result, it is possible to increase the holding force in the forward-backward direction due to the increasing number of friction surfaces. Moreover, in this example, by simply placing one telescopic pivoting friction plate 25 each in the portions located between the inside surfaces of the support plate sections 20a and the outside surfaces of the displacement bracket 18a, it is possible to increase the number of friction surfaces in these portions one at a time. Therefore, as the friction surfaces increase, it is possible adequately suppress an increase in the dimensions in left-right direction, an increase in the number of component parts and an increase in the weight.

Moreover, in this example, when an impact load is applied in a direction toward the front to the outer column 13a with the surface pressure at the areas of contact between the side surfaces of both sided of the pivoting friction plates 25 for telescopic mechanism and the inside surfaces of the support plate 20a and the outside surfaces of the displacement bracket 18a increased, the support pins 33 strongly press the inside edges of the pivot holes 31. As a result, there is a tendency for the pivoting friction plates 25 for telescopic mechanism to warp, and there is a tendency for the width dimension of these pivoting friction plates 25 for telescopic mechanism to increase. Consequently, the surface pressure at the areas of contact between the outside surfaces of the support plate sections 20a and the inside surface of the adjustment nut 29 and the inside surface of the head section 30 increases. As a result, of the holding force by which the support bracket 12a holds the outer column 13a, it is possible to maintain the holding force in the adjustment direction for the forward-backward position. Furthermore, in this example, the areas of contact between the side surfaces of both sides of the pivoting friction plates 25 for telescopic mechanism and the inside surfaces of the support plate sections 20a and the outside surfaces of the displacement bracket 18a become areas of contact between surfaces having different hardness. Therefore, when there is a tendency for slipping to occur at these areas of contact between surfaces having different hardness as a secondary collision occurs, it becomes difficult for slipping to occur at these areas of contact due to the surface having a higher hardness biting into the surface having a lower hardness. Due to this as well, of the holding force by which the support bracket 12a holds the outer column 13a, it is possible to maintain the holding force in the adjustment direction of the forward-backward position.

In this example, the pivot friction plates 25 are placed on both the left and right sides of the outer column 13a, however, it is also possible to place them on only one side in the left-right direction. Moreover, in this example, the inner column 14a is placed on the front side and the outer column is placed on the rear side, however, the present invention can also be applied to steering apparatus wherein the inner column is plated on the rear side and the outer column is placed on the front side. Furthermore, when the friction coefficient of the pivot friction plates 25 is not sufficient, it is possible to perform a surface treatment such as plating, coating, shot blasting, knurling or the like to the surface of the friction plates. In that case, it is preferable that the friction coefficient of the pivot friction plates 25 be 0.15 or greater.

Example 2

Figure 6:
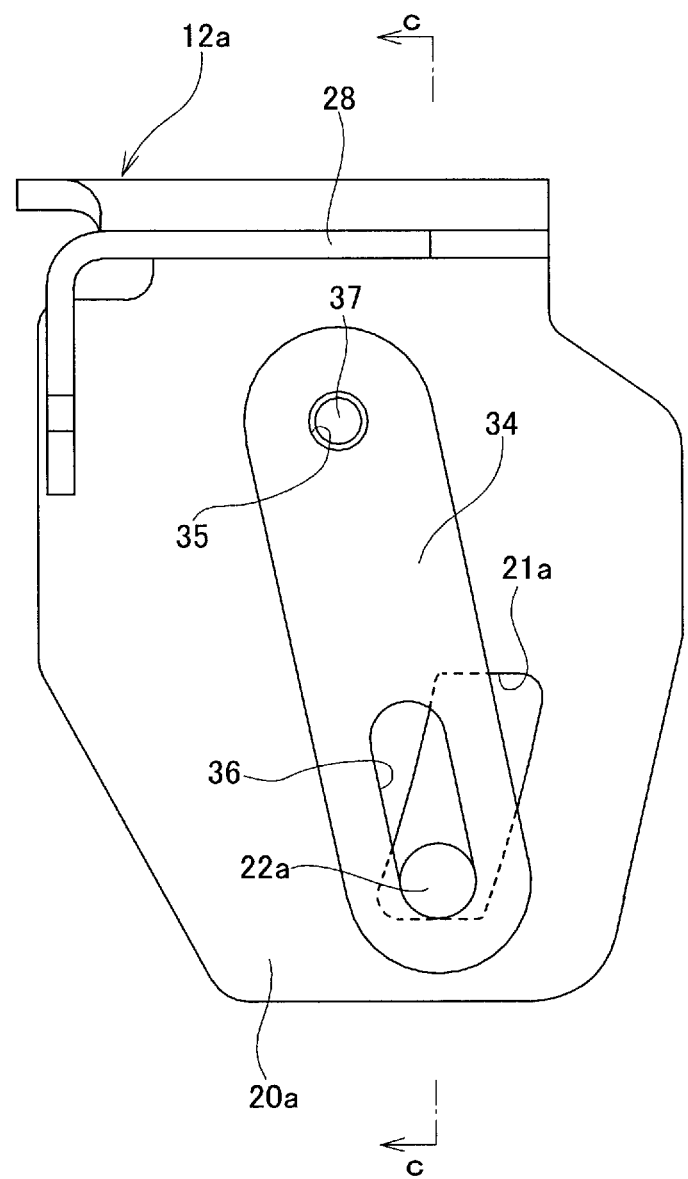
FIG. 6 illustrates a second example of an embodiment of the present invention, and is a drawing similar to FIG. 4 and illustrates a state in which the adjustment rod is located in the bottom end section of the long holes for tilt mechanism, with part of the members omitted.
Figure 7:
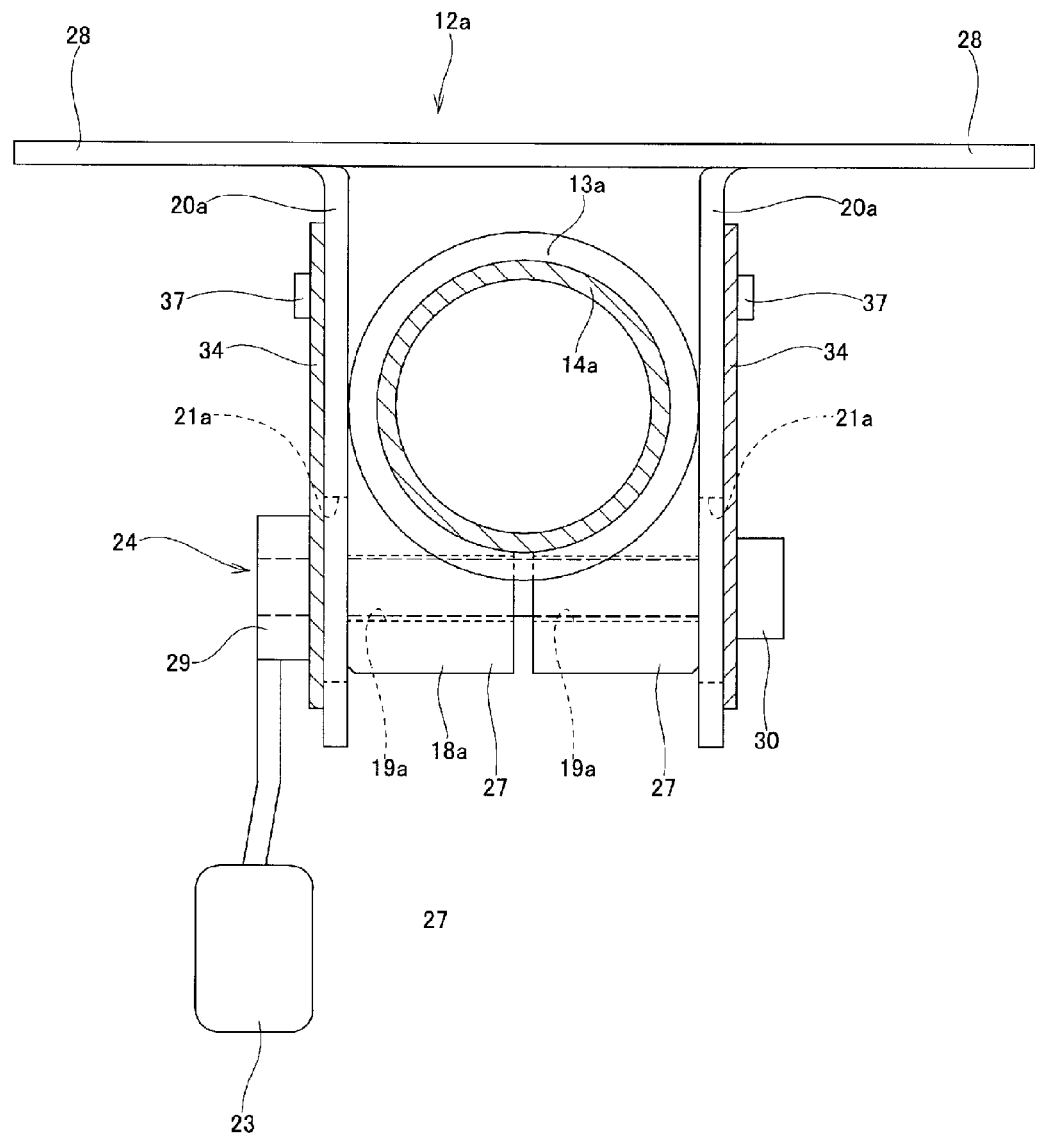
FIG. 7 is a cross-sectional view of section c-c in FIG. 6.
Figure 8:
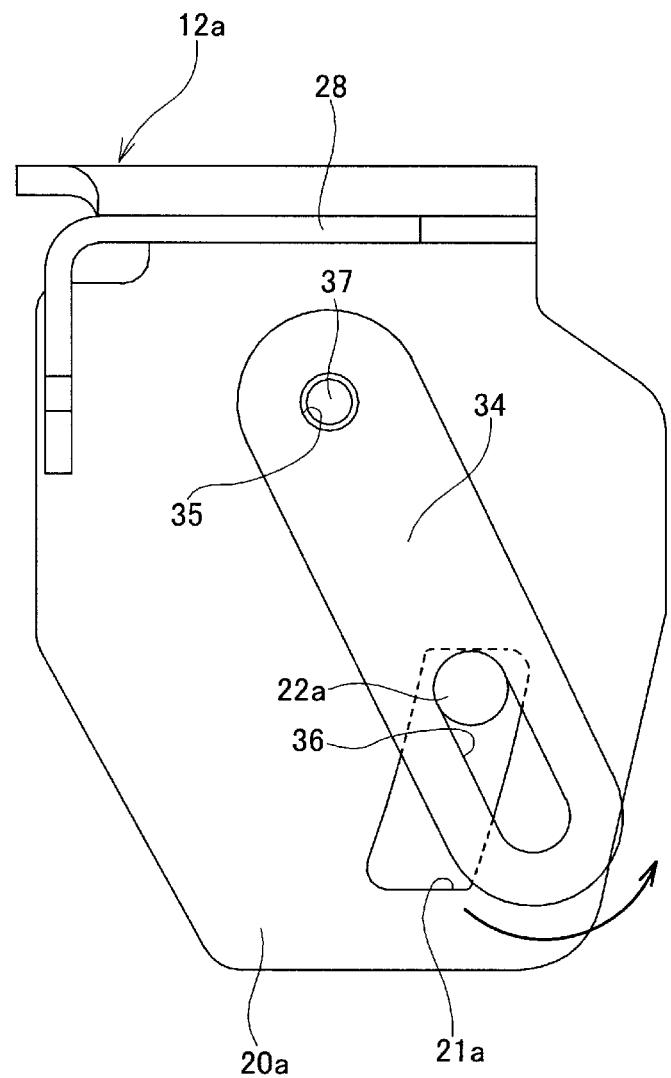
FIG. 8 is a drawing similar to FIG. 6, and illustrates a state in which the adjustment rod is located in the top end section of the long holes for tilt mechanism.

FIG. 6 to FIG. 8 illustrate a second example of an embodiment of the present invention. In this example, the construction differs from that of the first example of the embodiment in that the inside surfaces of the pair of support plate sections 20a of the support bracket 12a and the outside surfaces on both sides of the displacement bracket 18a come in direct contact with each other without there being pivoting friction plates for telescopic mechanism in between. Instead, in this example, a pair of pivoting friction plates 34 for tilt mechanism is held in portions located between the outside surface of a support plate section 20a and the inside surface of the adjustment nut 29 and the outside surface of a support plate section 20a and the inside surface of the head section 30a of the adjustment rod 22a.

In this example, the pair of pivoting friction plates 34 for tilt mechanism are constructed by flat members having an elliptical shape which are made using metal plate. These pivoting friction plates 34 for tilt mechanism have a pivot hole 35 on one end section in the lengthwise direction, and have a straight long guide hole 36 that extends from the middle section to the other end section in the lengthwise direction. These pivoting friction plates 34 for tilt mechanism are held in portions located between the outside surfaces of the support plate sections 20a and the inside surface of the adjustment nut 29 and the inside surface of the head section 30 of the adjustment rod 22a. In this state, the adjustment rod 22a is inserted through the long guide holes 36 in the pivoting friction plates 34 for tilt mechanism so as to be able to displace along the long guide holes 36. At the same time, support pins 37, which protrude from the portions of part of the outside surfaces of the support plates 20a that are separated from the long holes 21a for tilt mechanism, engages with the pivot hole 35 such that only pivotal displacement of the pivoting friction plates 34 around the support pins 37 is possible. In this example, the support pins 37 are located on the outside surfaces of the support plate sections 20a further toward the front and top than the long holes 21a for tilt mechanism.

In this example as well, when adjusting the up-down position or forward-backward position of the steering wheel 1 (see FIG. 41), as in the first example of the embodiment, by turning the adjustment handle 23 in a specified direction, the space between the adjustment nut 29 and the head section 30 of the adjustment rod 22a is expanded, and the surface pressure at the engaging section between the inner circumferential surface of the front end section of the outer column 13a and the outer circumferential surface of the rear end section of the inner column 14a decreased or is lost. Also, in this state, the position of the steering wheel 1 is adjusted within a range that the adjustment rod 22a can displace in the long holes 19a for telescopic mechanism and the long holes 21a for tilt mechanism. However, in the case of the steering apparatus of this example, by providing a circular hole instead of long holes 19a for telescopic mechanism in the displacement bracket 18a, construction is possible wherein only a tilt position adjustment mechanism is provided.

Particularly, in this example, when the outer column 13a is displaced in the up-down direction within the rage that the adjustment rod 22a can displace inside the long holes 21a for tilt mechanism in order to adjust the up-down position of the steering wheel 1, the pivoting friction plates 34 for tilt mechanism pivot around the support pins 37 as illustrated in FIG. 6 and FIG. 8. In other words, as the outer column 13a is caused to displace in the downward direction, the adjustment rod 22a displaces along the long holes 21a for tilt mechanism and long guide holes 36 from the state illustrated in FIG. 8 to the state illustrated in FIG. 6, and the pivoting friction plates 34 for tilt mechanism pivot in the clockwise direction in FIG. 6 and FIG. 8 around the support pins 37. As a result, there is relative displacement between the adjustment rod 22a and the support pin 37 in a direction away from each other. However, when the outer column 13a is caused to displace in the upward direction, the adjustment rod 22a displaces along the long holes 21a for tilt mechanism and long guide holes 36 from the state illustrated in FIG. 6 to the state illustrated in FIG. 8, and the pivoting friction plates 34 for tilt mechanism pivot in the counterclockwise direction in FIG. 6 and FIG. 8 around the support pins 37. As a result, there is relative displacement between the adjustment rod 22a and the support pin 37 in a direction toward each other. Moreover, in this example, in the overall pivot range, the tangential direction of the portion where the adjustment rod 22a engages with the long guide holes 36, and the tangential direction of the portion of the long holes 21a for tilt mechanism through which the adjustment rod is inserted do not coincide with each other.

After the position of the steering wheel 1 has been adjusted, by turning the adjustment handle 23 in the opposite direction of the specified direction, the space between the adjustment nut 29 and the head section 30 is contracted. As a result, the surface pressure at the engaging section between the inner circumferential surface of the front end section of the outer column 13a and the outer circumferential surface of the rear end section of the inner column 14a increases, and the maintains the steering wheel 1 in the adjusted position.

In the case of the steering apparatus of this example as well, for the same reasons as in the case of the first example of the embodiment, the areas of contact between both side surfaces of the pivoting friction plates 34 for tilt mechanism and the outside surfaces of the support plate sections 20a, the inside surface of the adjustment nut 29 and the inside surface of the head section 30 effectively function as friction surfaces for maintaining the holding force in the up-down direction of the holding force by which the support bracket 12 holds the outer column 13a. Therefore, compared with construction wherein the pair of surfaces holding the pivoting friction plates 34 for tilt mechanism come in direct contact with each other, and having the areas of contact between these surfaces function as friction surfaces, in the case of this example, it is possible to increase the number of friction surfaces at each installation location of the pivoting friction plates 34 for tilt mechanism one at a time. As a result, it is possible to improve the holding force in the up-down direction. Moreover, in this example, by simply placing one pivoting friction plate 34 for tilt mechanism each in the portions located between the outside surfaces of the support plate sections 20a and the inside surface of the adjustment nut 29 and the inside surface of the head section 30a, it is possible to increases the number of friction surfaces between these surface one at a time. Therefore, it is possible to sufficiently suppress the amount of increased in the dimensions in the left-right direction, the number of parts and the weight as the friction surfaces increase.

Furthermore, in this example, when an impact load is applied in a forward direction to the outer column 13a during a secondary collision, there is a tendency for the adjustment rod 22a to displace upward along the long holes 21a for tilt mechanism, and for the outer column 13a to lift up. As a result, there is a tendency for the pivoting friction plates 34 for tilt mechanism to be compressed and warp in portions between the portions that are held between the outside surfaces of the support plate sections 20a, and the inside surface of the adjustment nut 29 and the inside surface of the head section 30 of the adjustment rod 22a, and the support pins 37, and a tendency for the width dimension of the pivoting friction plates 34 for tilt mechanism to increase. Also, the surface pressure at the areas of contact between the inside surfaces of the support plate sections 20a and the outside surfaces of the held plate sections 27. As a result, of the holding force by which the support bracket 12a holds the outer column 13a, it is possible to maintain the holding force in the up-down direction. The construction and functions of the other parts of this example are the same as in the first example of the embodiment.

Example 3

Figure 9:
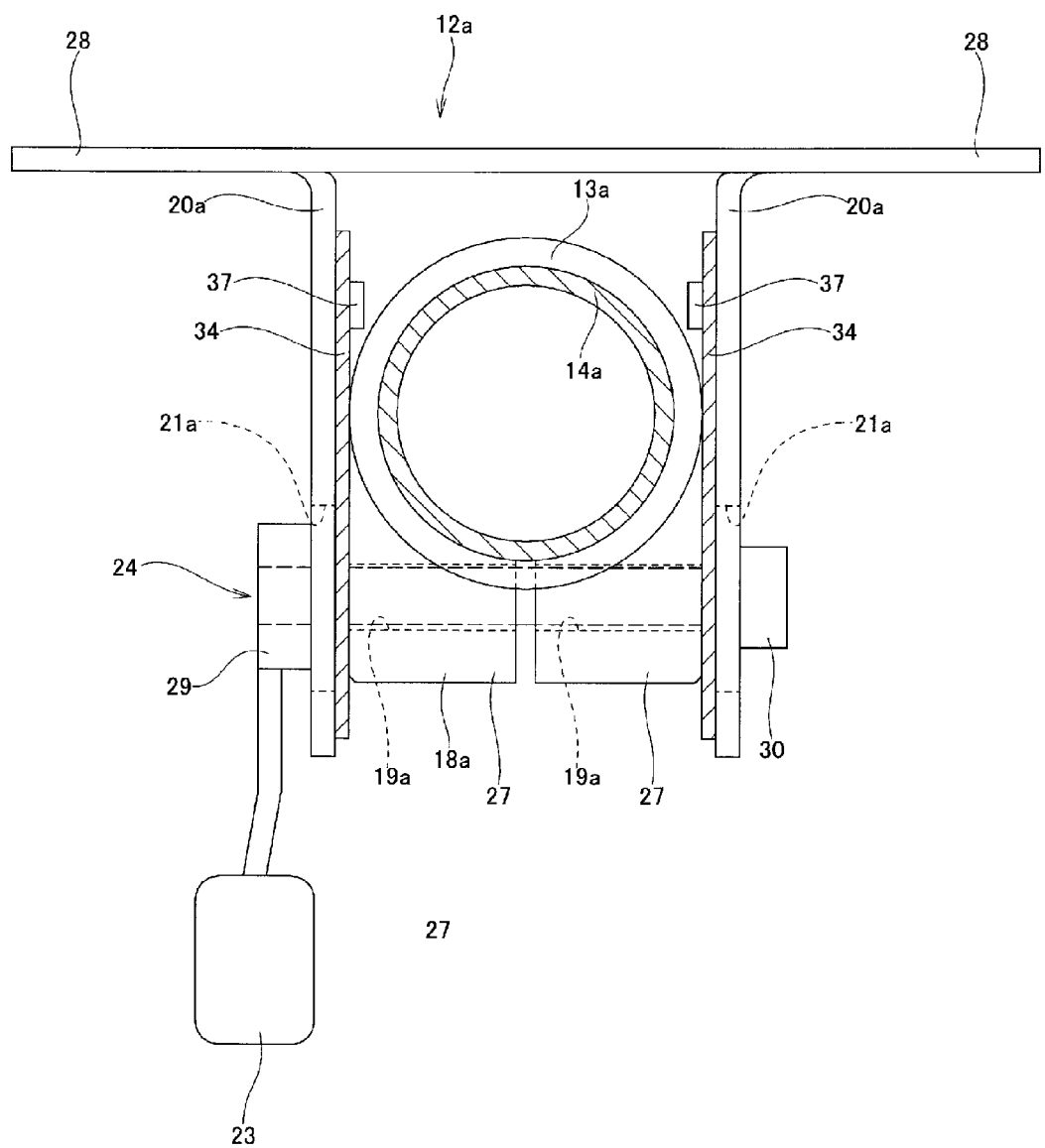
FIG. 9 is a drawing similar to FIG. 7, and illustrates a third example of an embodiment of the present invention.

FIG. 9 illustrates a third example of an embodiment of the present invention. In this example, the pivoting friction plates 34 for tilt mechanism are held in the portions located between the inside surfaces of the support plate sections 20a and the outside surfaces of the held plate sections 27 of the outer column 13a. The construction and functions of the other parts are the same as in the second example of the embodiment.

Example 4

Figure 10:
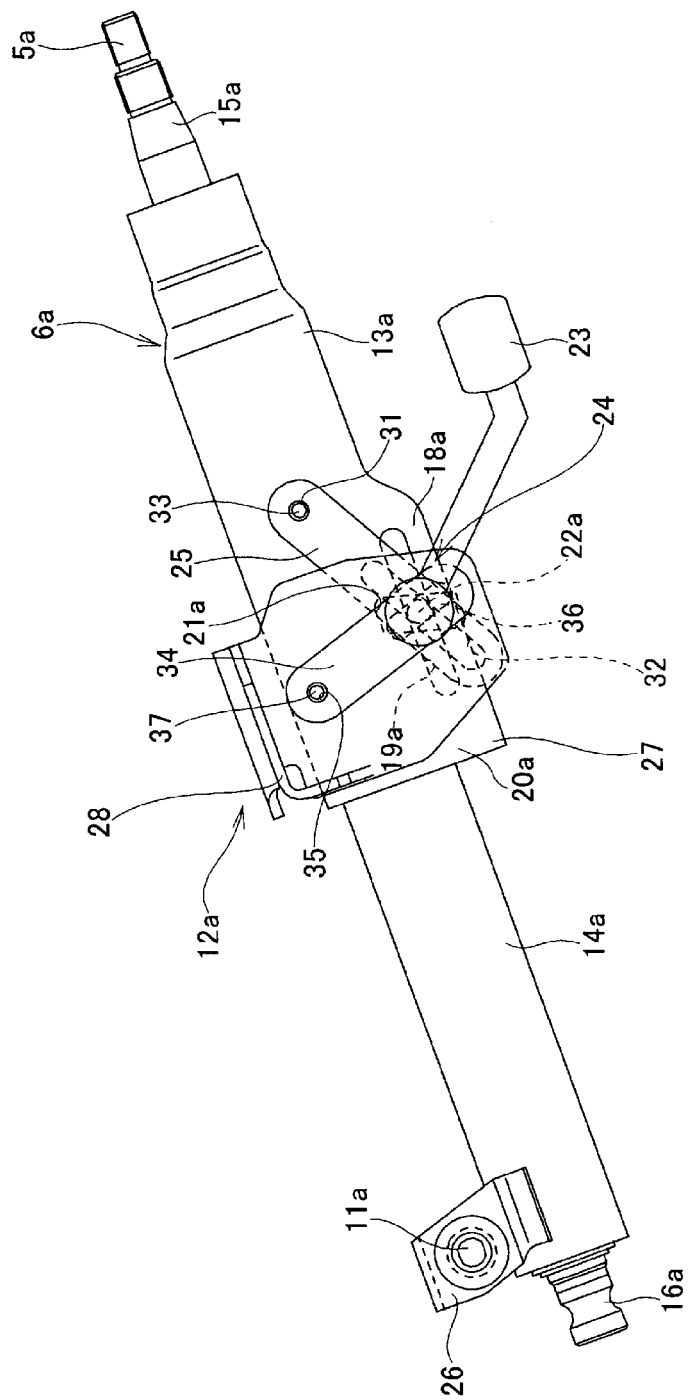
FIG. 10 is a drawing similar to FIG. 1, and illustrates a fourth example of an embodiment of the present invention.
Figure 11:
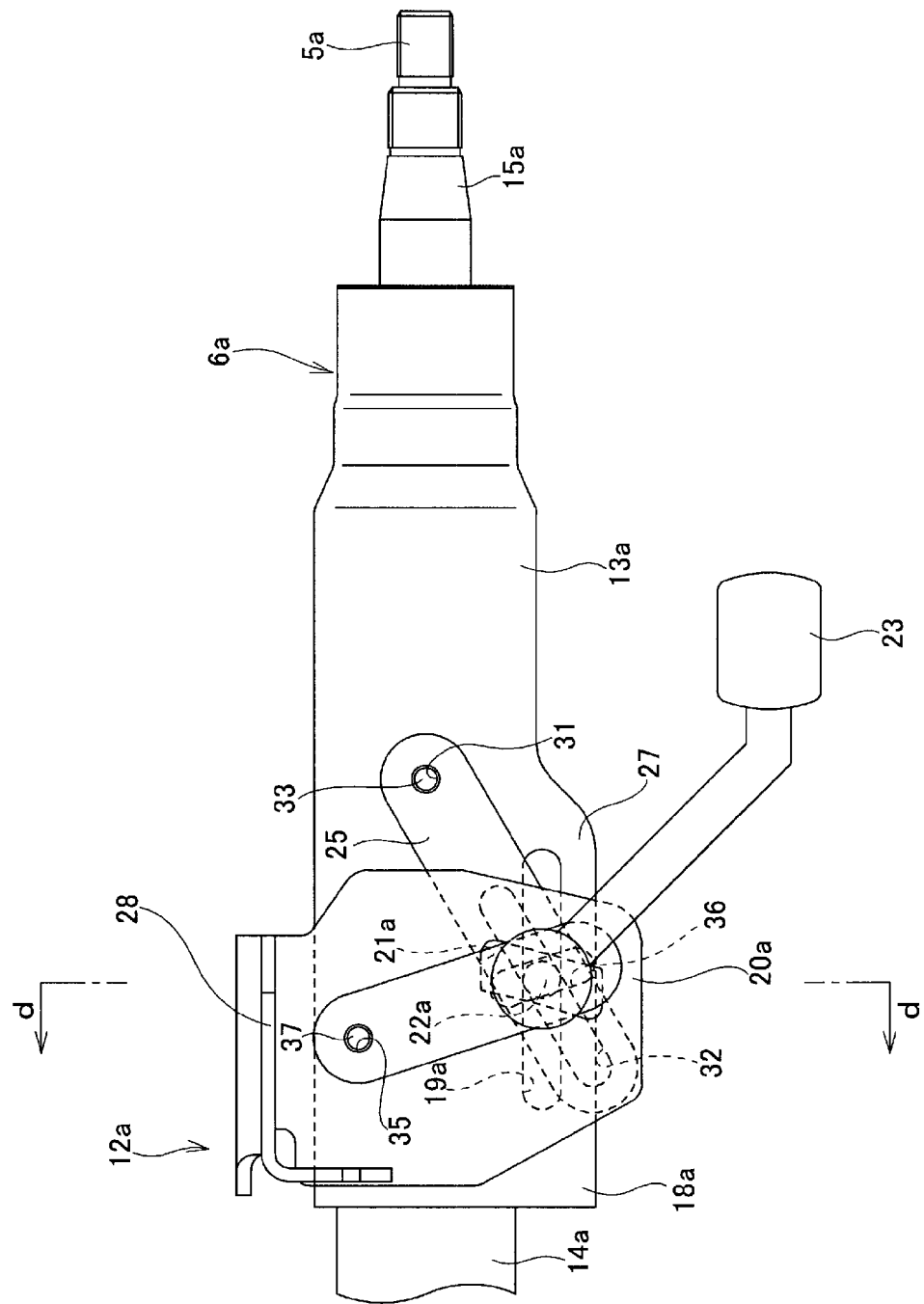
FIG. 11 is a partial enlarged drawing of the right half in FIG. 10.
Figure 12:
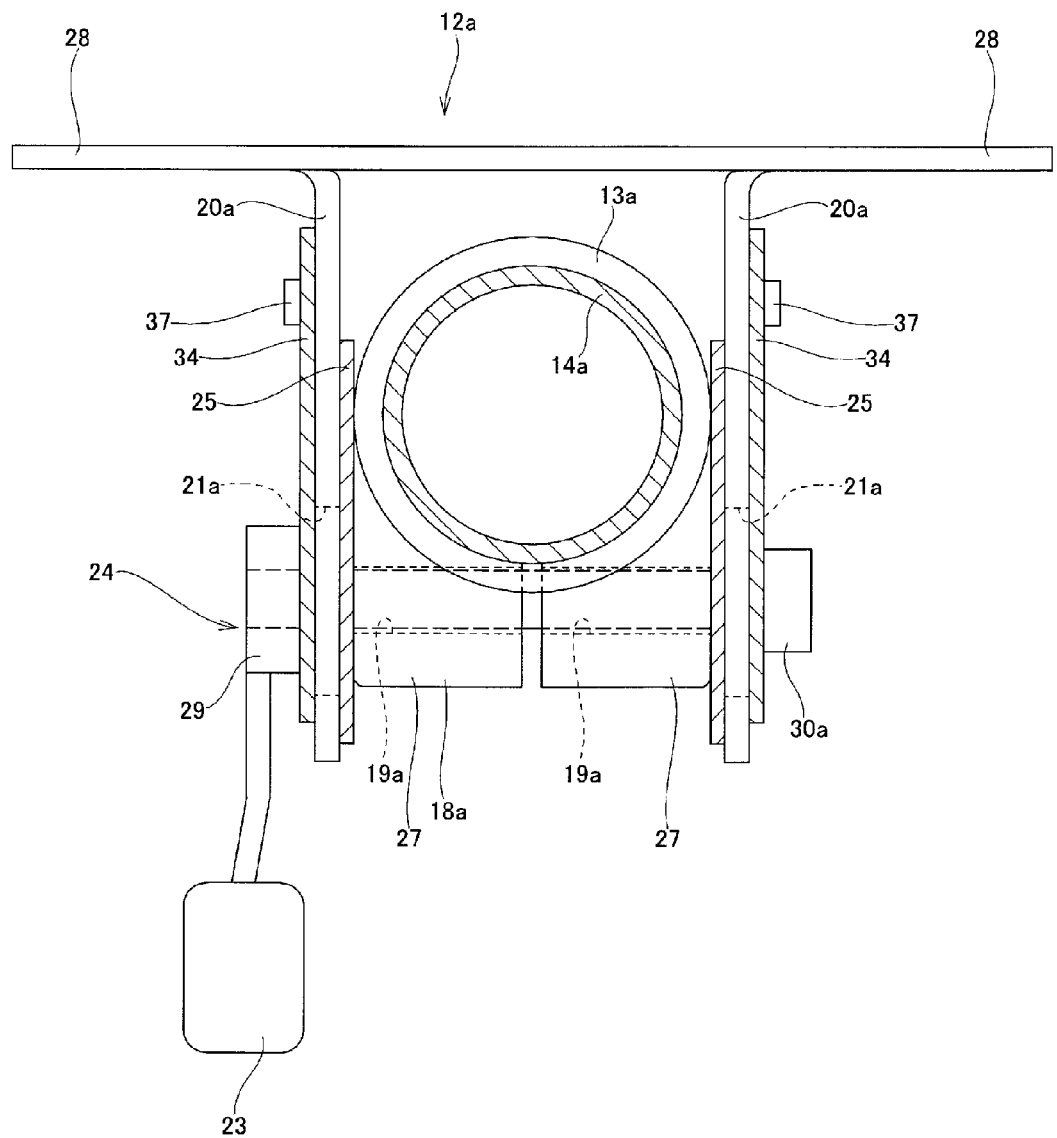
FIG. 12 is a cross-sectional view of section d-d in FIG. 11.

FIG. 10 to FIG. 12 illustrate a fourth example of an embodiment of the present invention. This example has construction that combines the first example and second example of the embodiment. In other words, pivoting friction plates 25 for telescopic mechanism are held between the inside surfaces of the support plate sections 20a and the outside surfaces of the held plate sections 27, and pivoting friction plates 34 for tilt mechanism are held between the outside surface of a support plate section 20a and the inside surface of the adjustment nut 29 and the outside surface of a support plate section 20a and the inside surface of the head section 30a of the adjustment rod 22a. With this kind of construction, it is possible to maintain the holding force by which the support bracket 12a holds the outer column 13a in both the up-down direction and forward-backward direction. The construction and functions of the other parts of this example are the same as in the first and second examples of the embodiment.

Example 5

Figure 13:
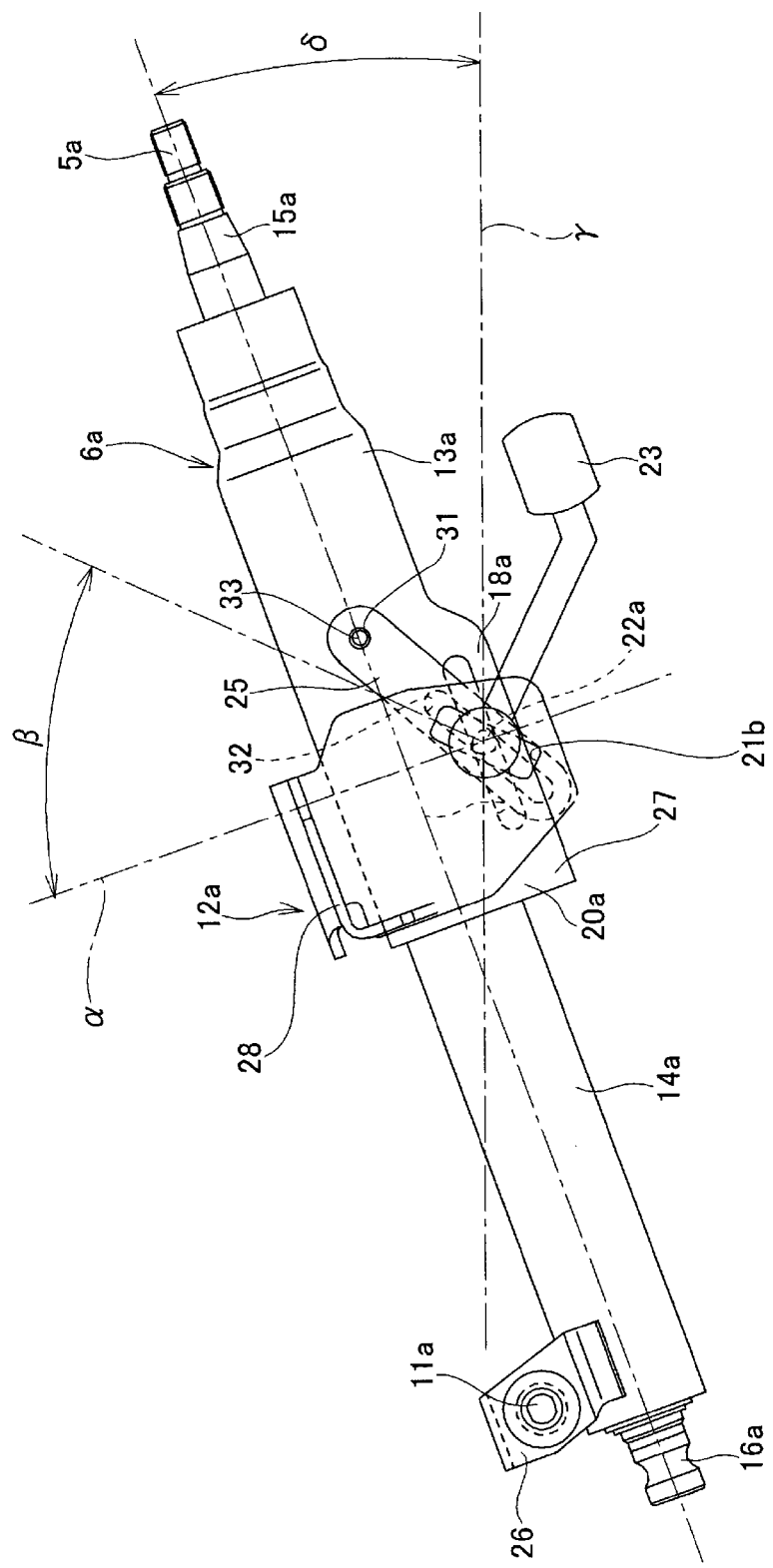
FIG. 13 is a drawing similar to FIG. 1, and illustrates a fifth example of the present invention.

FIG. 13 illustrates a fifth example of an embodiment of the present invention. This example has construction in which the present invention has been applied to the construction disclosed in JP 2011-52639 (A). In other words, the inclination angle 13 of the long holes 21b for tilt mechanism with respect to a virtual plate a that is orthogonal to the center axis of the steering column 6a is greater than the inclination angle δ of the center axis of the steering column 6a with respect to the forward-backward direction γ, regardless of the up-down position of the steering wheel 1 (see FIG. 41). Therefore, the force component that tries to cause the adjustment rod 22a to displace to the front and downward in the long holes 21b for tilt mechanism due to an impact load in the forward direction that is applied to the steering wheel 1 during a secondary collision becomes definitely larger than the force component that tries to cause the adjustment rod 22a to displace to the rear and upward in the long holes 21b for tilt mechanism. As a result, lifting up of the outer column 13a is prevented, and it is possible to keep the position of the steering wheel 1 against which the body of the driver collides in a proper position. The construction and functions of the other parts of this example are the same as in the first example of the embodiment.

Example 6

Figure 14:
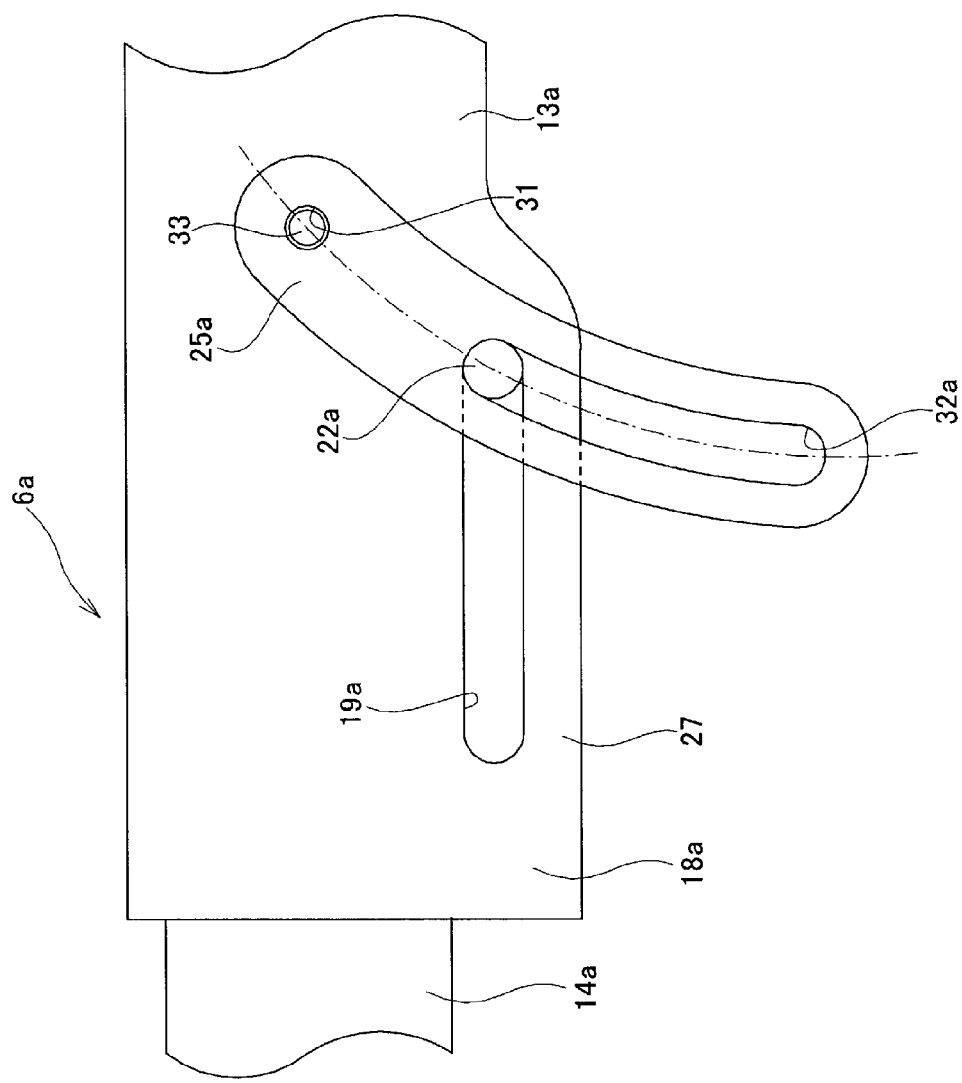
FIG. 14 illustrates a sixth example of an embodiment of the present invention, and is a drawing similar to FIG. 4 and illustrates a state in which the adjustment rod is located in the rear end section of the long holes for telescopic mechanism with part of the members omitted.
Figure 15:
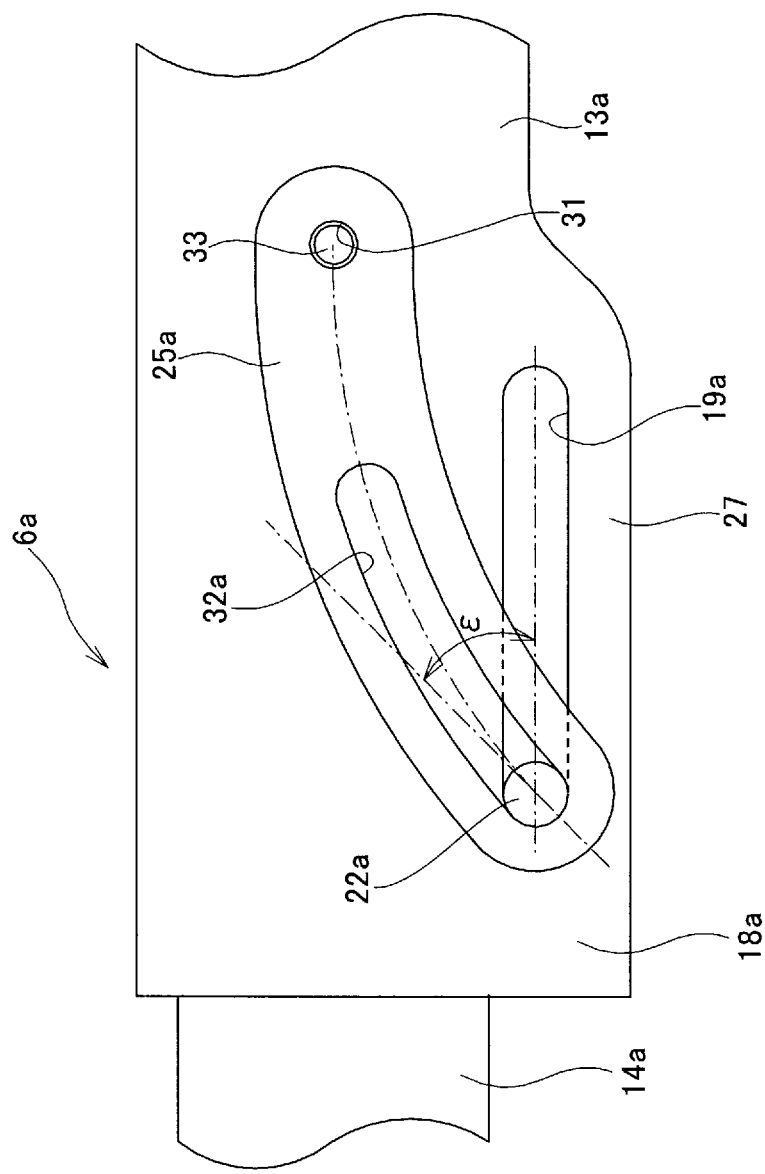
FIG. 15 is a drawing similar to FIG. 14, and illustrates a state in which the adjustment rod is located in the front end section of the long holes for telescopic mechanism.
Figure 16:
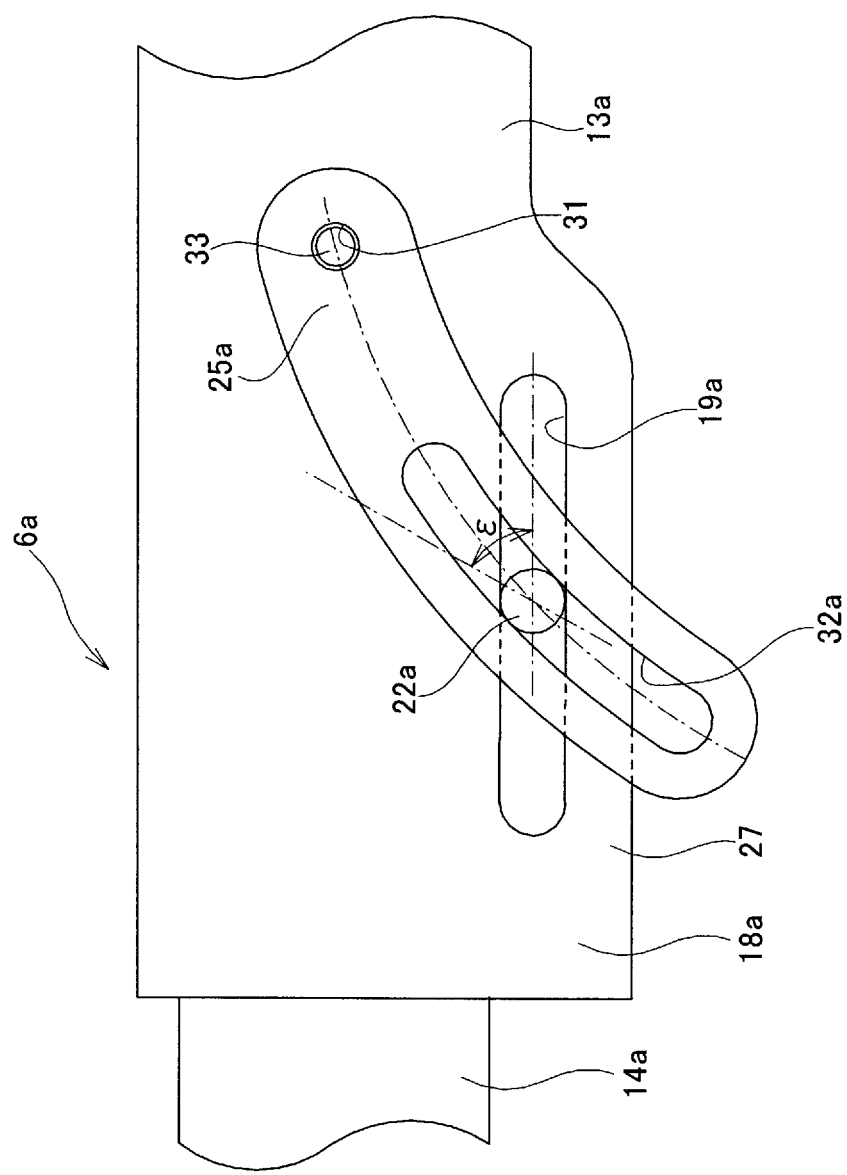
FIG. 16 is a drawing similar to FIG. 14, and illustrates a state in which the adjustment rod is located in the middle section of the long holes for telescopic mechanism.

FIG. 14 to FIG. 16 illustrate a sixth example of an embodiment of the present invention. In this example, of the pivot holes 31 and the long guide holes 32a that are formed in the pivoting friction plates 25a for telescopic mechanism, the long guide holes 32a are arc shaped, and the pivot holes 32 and long guide holes 32*a* are located on the same arc. The pivoting friction plates 25*a* for telescopic mechanism are also arc shaped. By employing this construction, it is possible for pivoting of the pivoting friction plates 25*a* for telescopic mechanism around the support pins 33 when adjusting the forward-backward position of the steering wheel 1 (see FIG. 41) to be performed more smoothly.

Moreover, in this example, the angle $\epsilon$ between the axial direction of the outer column 13*a* and the tangential direction of the portions of the long guide holes 32*a* that the adjustment rod 22*a* engages with can be maintained nearly constant and large to some extent regardless of the forward-backward position of the steering wheel 1. As a result, it is possible to make it difficult for the adjustment rod 22*a* to displace in the forward and downward direction along the long guide holes 32*a* regardless of the impact load in the forward direction that is applied to the steering wheel 1 during a secondary collision. The construction and effects of other parts of this example are the same as in the first example of the embodiment.

Example 7

Figure 17:
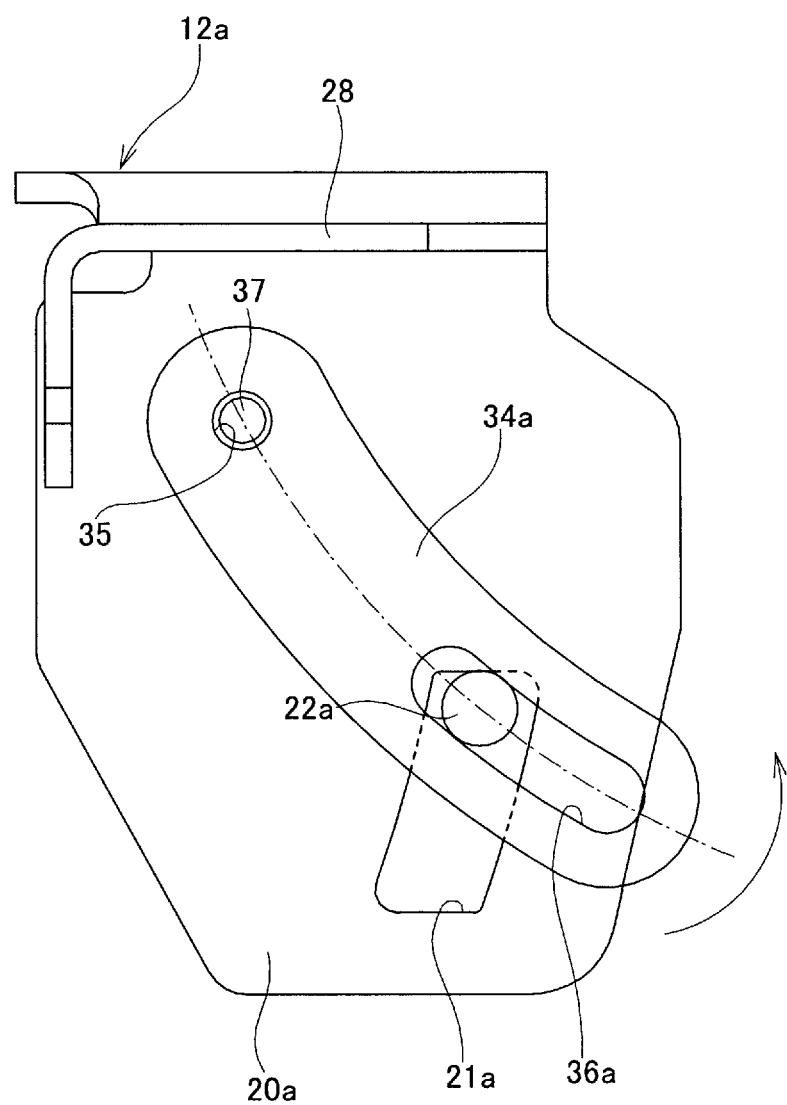
FIG. 17 illustrates a seventh example of an embodiment of the present invention, and is a drawing similar to FIG. 4, and illustrates a state in which the adjustment rod is located in the top end section of the long holes for tilt mechanism, with part of the members omitted.
Figure 18:
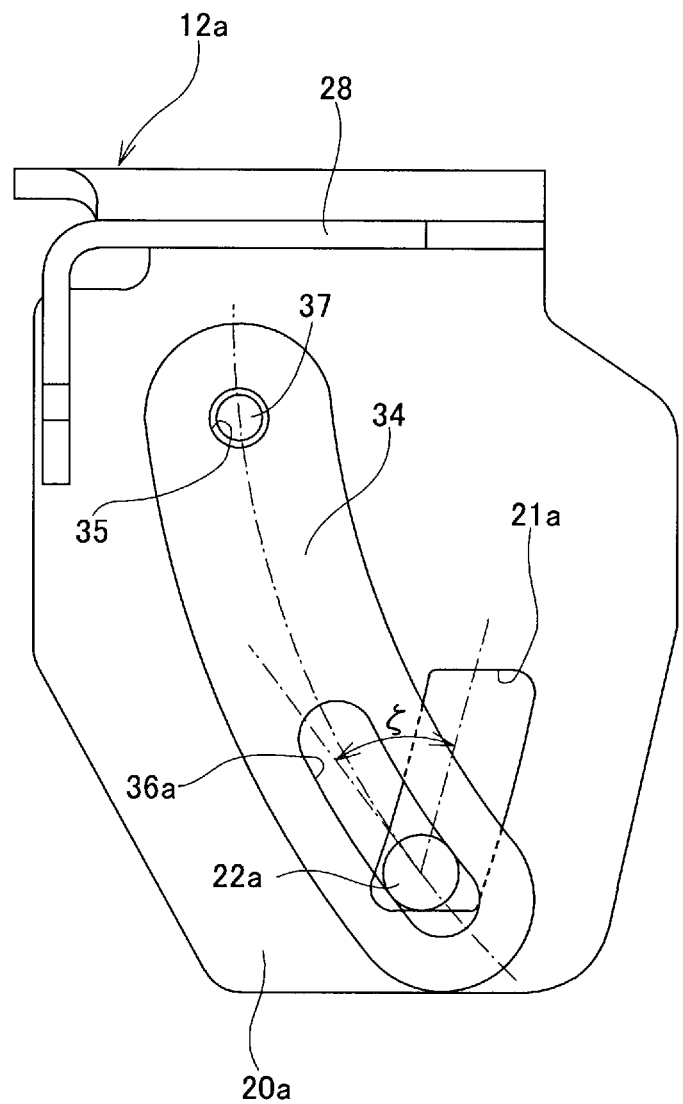
FIG. 18 is a drawing similar to FIG. 17, and illustrates a state in which the adjustment rod is located in the bottom end section of the long holes for tilt mechanism.
Figure 19:
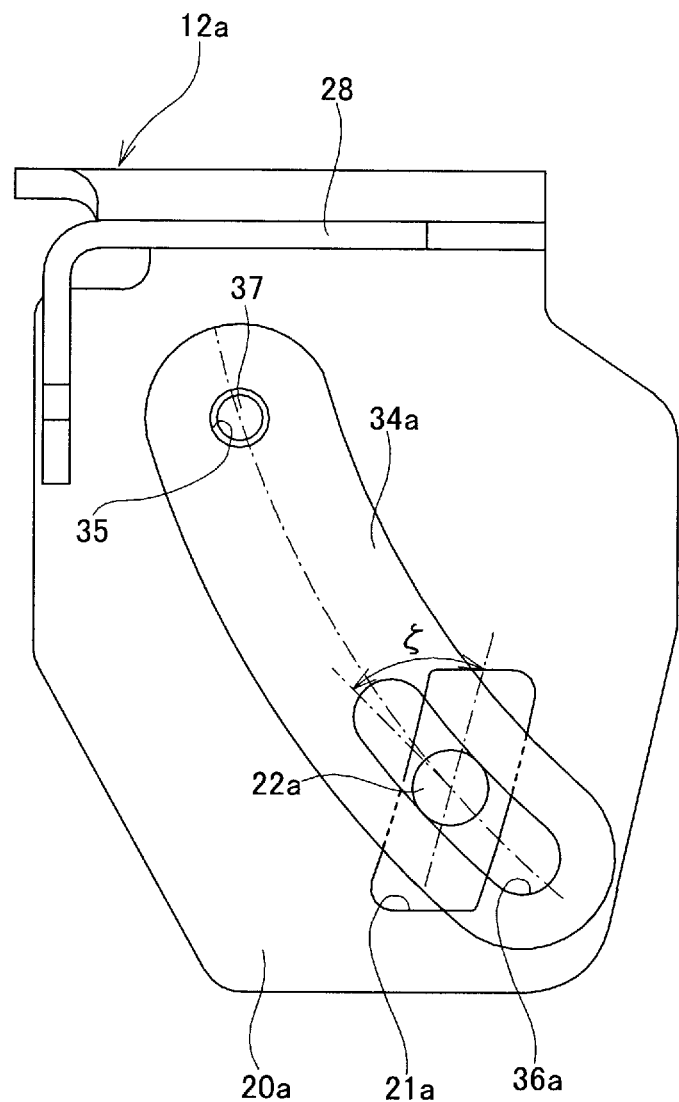
FIG. 19 is a drawing similar to FIG. 17, and illustrates a state in which the adjustment rod is located in the middle section of the long holes for tilt mechanism.

FIG. 17 to FIG. 19 illustrate a seventh example of an embodiment of the present invention. In this example, of the pivot holes 35 and the long guide holes 36*a* that are formed in the pivoting friction plates 34*a* for tilt mechanism, the long guide holes 36*a* have an arc shape, and the pivot holes 35 and long guide holes 36*a* are located on the same arc. To correspond with this, the tilt pivoting friction plates 34*a* have an arc shape. As a result, it is possible for pivoting of the pivoting friction plates 34*a* for tilt mechanism around the support pins 37 when adjusting the up-down position of the steering wheel 1 (see FIG. 41) to be performed more smoothly.

Moreover, in this example, the angle $\xi$ between the tangential direction of the portions of the long holes 21*a* for tilt mechanism that the adjustment rod 22*a* engages with and the tangential direction of the portions of the long guide holes 36*a* that the adjustment rod 22*a* engages with can be maintained nearly constant and large to some extent regardless of the up-down position of the steering wheel 1. As a result, it is possible to more effectively prevent the adjustment rod 22*a* from displacing upward along the long holes 21*a* for tilt mechanism, and prevent the outer column 13*a* from lifting up regardless of an impact load in forward direction that is applied to the steering wheel 1 during a secondary collision. The construction and effects of the other parts of this example are the same as in the second example of the embodiment.

Example 8

Figure 20:
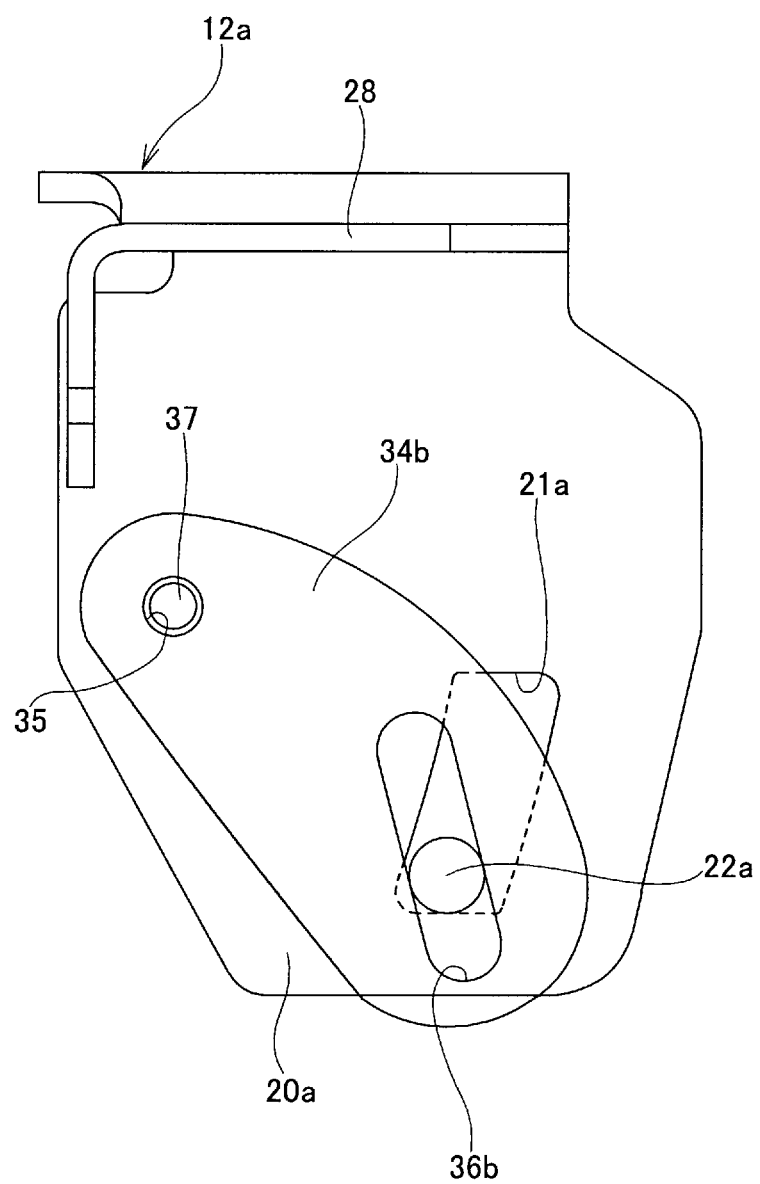
FIG. 20 illustrates an eighth example of an embodiment of the present invention, and is a drawing similar to FIG. 4, and illustrates a state in which the adjustment rod is located in the bottom end section of the long holes for tilt mechanism, with part of the members omitted.
Figure 21:
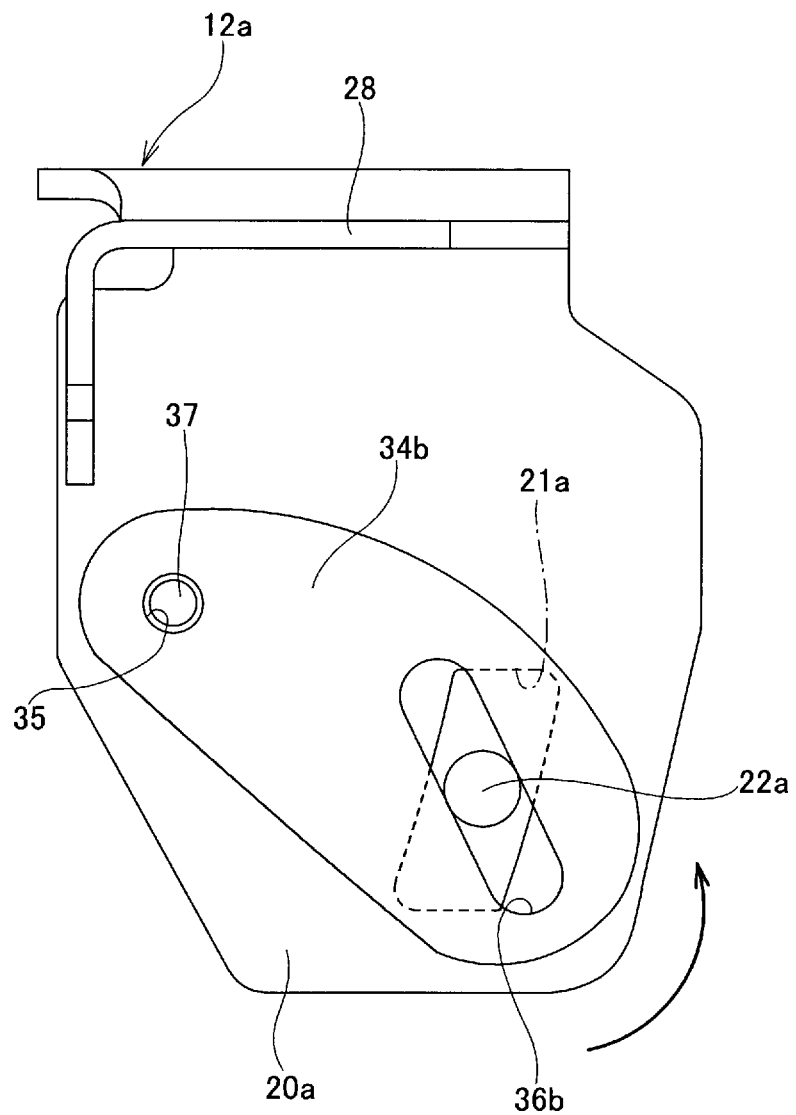
FIG. 21 is a drawing similar to FIG. 20, and illustrates a state in which the adjustment rod is located in the middle section of the long holes for tilt mechanism.

*FIG. 20 and FIG. 21 illustrate an eighth example of an embodiment of the present invention. In this example, the shape of the pivoting friction plates 34*b* for tilt mechanism and the formation direction of the long guide holes 36*b* differ from that in the second example of the embodiment. In other words, of the edges on both sides in the width direction of the pivoting friction plates 34*b* for tilt mechanism, by making the edge on one side arc shaped, the surface area of the pivoting friction plates 34*b* for tilt mechanism becomes larger than that of the pivoting friction plates 34 for tilt mechanism in the second example of the embodiment (see FIG. 6). As a result, of the holding force by which the support bracket 12*a* supports the outer column 13*a*, it is possible to increase the holding force in the up-down direction. The construction and effects of the other parts of this example are the same as in the second example of the embodiment.

Example 9

Figure 22:
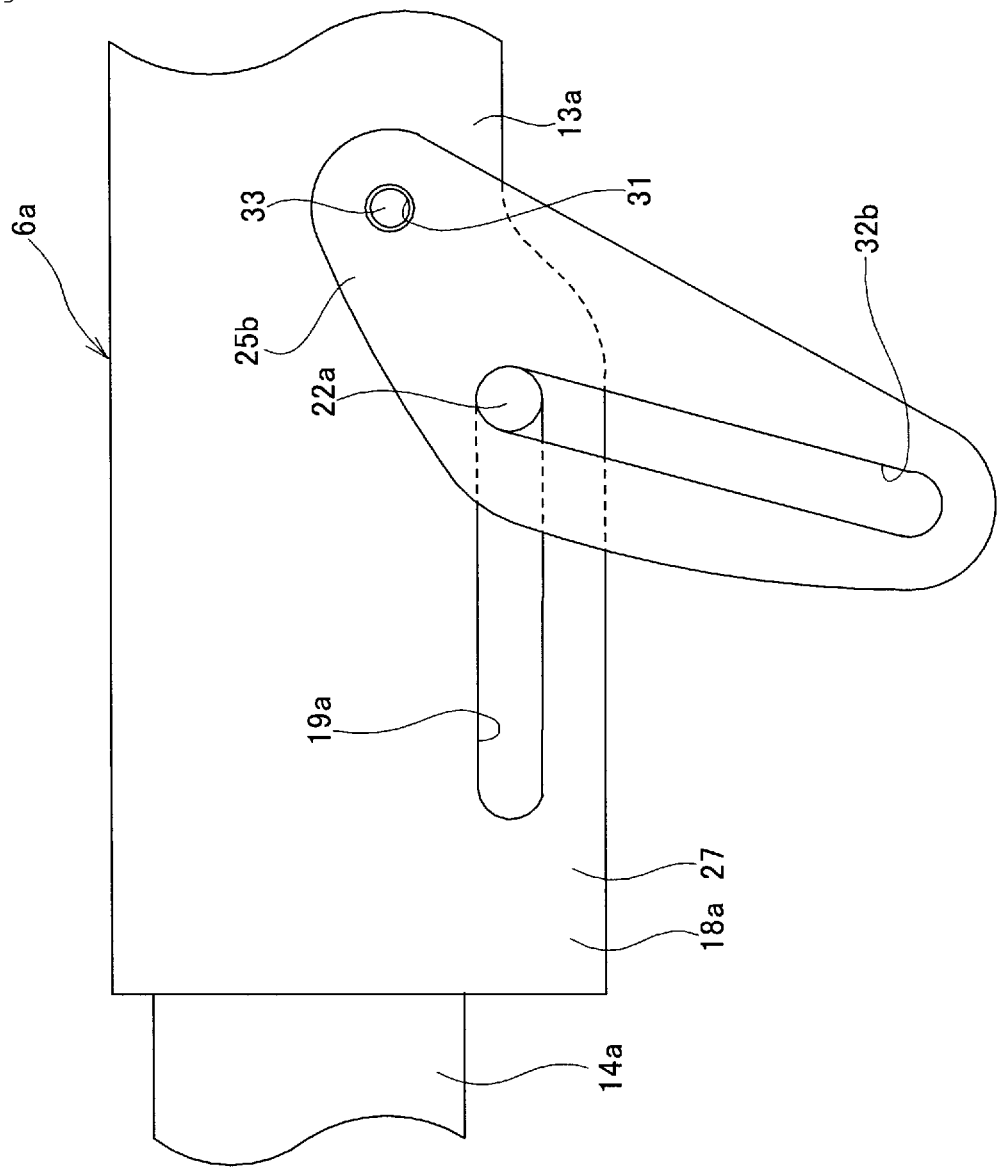
FIG. 22 illustrates a ninth example of an embodiment of the present invention, and is a drawing similar to FIG. 4, and illustrates a state in which the adjustment rod is located in the rear end section of the long holes for telescopic mechanism, with part of the members omitted.
Figure 23:
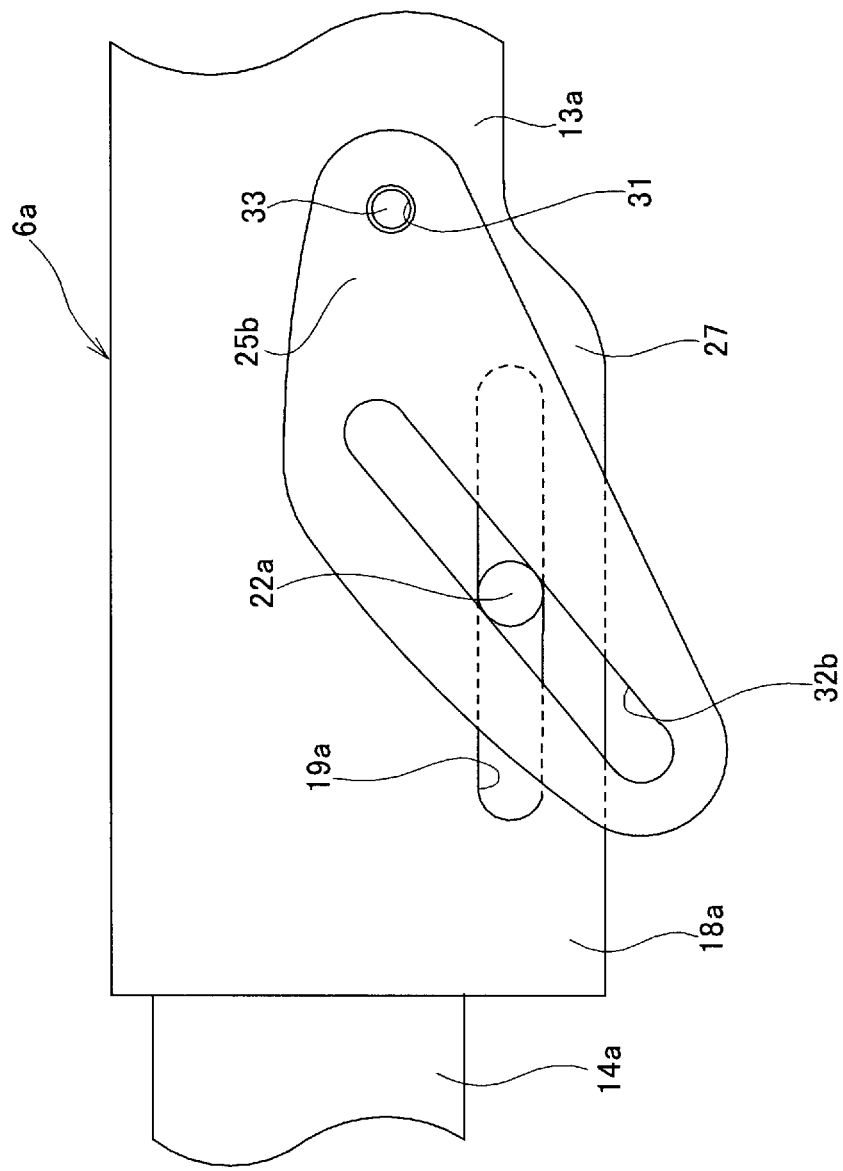
FIG. 23 is a drawing similar to FIG. 22, and illustrates a state in which the adjustment rod is located in the middle section of the long holes for telescopic mechanism.

FIG. 22 and FIG. 23 illustrate a ninth example of an embodiment of the present invention. In this example, the shape of the pivoting friction plates 25*b* for telescopic mechanism and the formation direction of the long guide holes 32*b* differ from those in the first example of the embodiment. In other words, by making the pivoting friction plates 25*b* for telescopic mechanism triangular, the surface area of the pivoting friction plates 25*b* for telescopic mechanism is made to be larger than that of the pivoting friction plates 25 for telescopic mechanism in the first example of the embodiment. As a result, it is possible to increase the holding force by which the support bracket 12*a* holds the outer column 13*a*. The construction and effects of the other parts of the example are the same as in the first example.

Example 10

Figure 24:
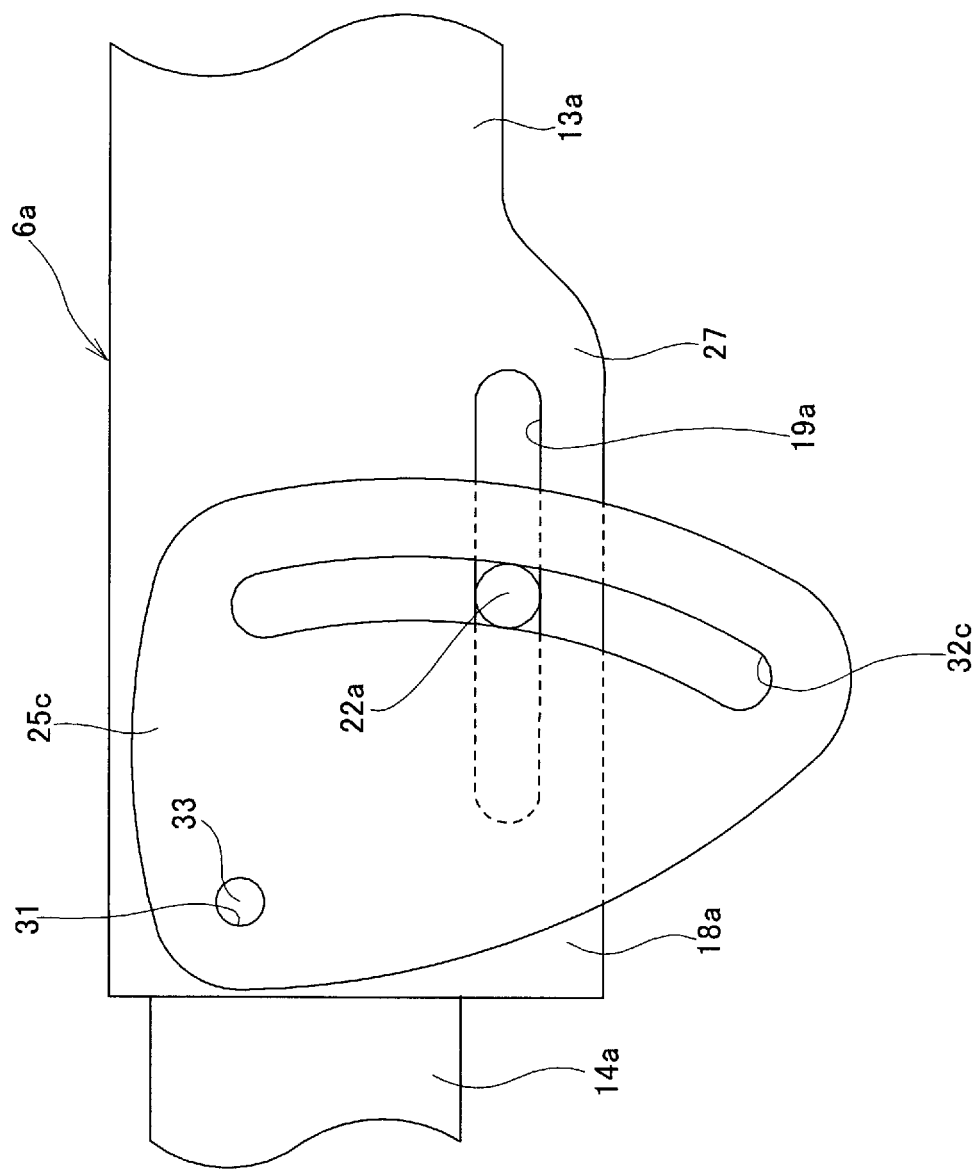
FIG. 24 illustrates a tenth example of an embodiment of the present invention, and is a drawing similar to FIG. 4, and illustrates a state in which the adjustment rod is located in the middle section of the long holes for telescopic mechanism, with part of the members omitted.

FIG. 24 illustrates a tenth example of an embodiment of the present invention. In this example, the pivoting friction plates 25*c* for telescopic mechanism have a triangular shape, and the support pin 33 is located in the upper portion of the outer column 13*a* further on the front side than the long holes 19*a* for telescopic mechanism. As a result, the surface area of the portions of the pivoting friction plates 25*c* for telescopic mechanism that are held between the support plate sections 20*a* (see FIG. 1 to FIG. 3) and the held plate sections 27 is increased. Moreover, by making the long guide holes 32*c* arc shaped, pivotal displacement of the pivoting friction plates 25*c* for telescopic mechanism is performed smoothly, and it becomes difficult for the adjustment rod 22*a* to displace along the long guide holes 32*c* during a secondary collision. The construction and effects of the other parts of this example are the same as in the first example of the embodiment.

Example 11

Figure 25:
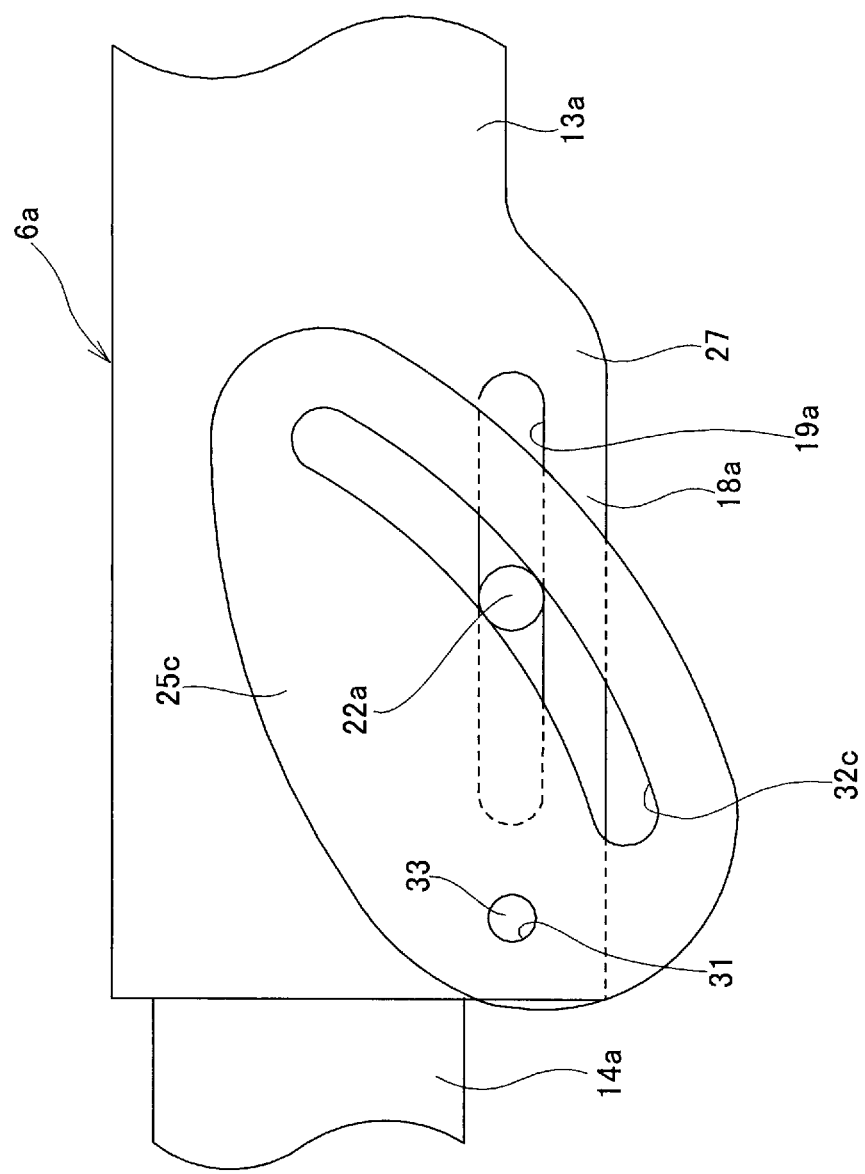
FIG. 25 illustrates an eleventh example of an embodiment of the present invention, and is a drawing similar to FIG. 4, and illustrates a state in which the adjustment rod is located in the middle section of the long holes for telescopic mechanism, with part of the members omitted.

FIG. 25 illustrates an eleventh example of an embodiment of the present invention. In this example, the support pin 33 is provided in front of the long holes 19*a* for telescopic mechanism. The construction and effects of the other parts of this example are the same as in the tenth example.

Example 12

Figure 26:
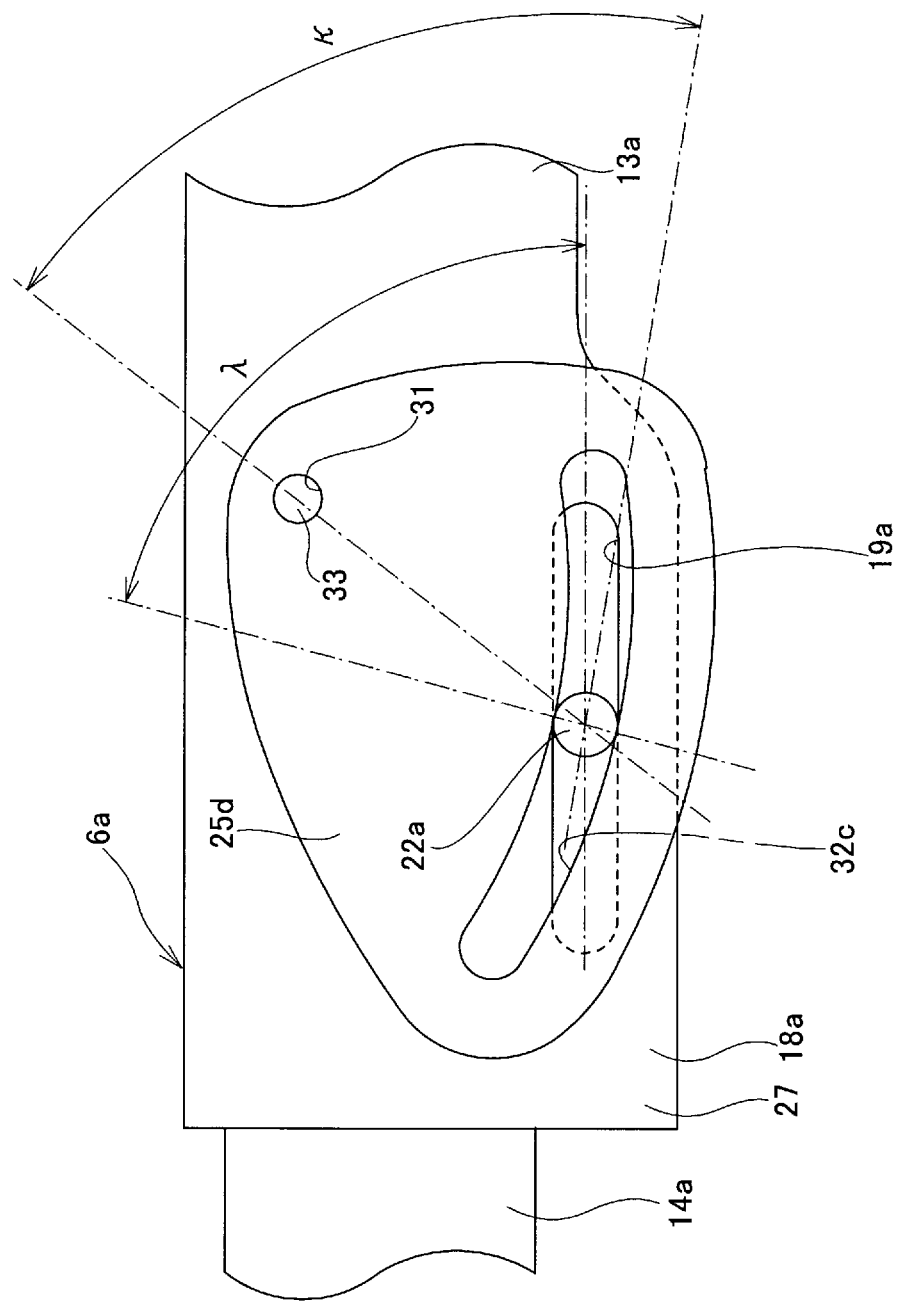
FIG. 26 illustrates a twelfth example of an embodiment of the present invention, and is a drawing similar to FIG. 4, and illustrates a state in which the adjustment rod is located in the middle section of the long holes for telescopic mechanism, with part of the members omitted.

FIG. 26 illustrates a twelfth example of an embodiment of the present invention. In this example, the pivoting friction plates 25*d* for telescopic mechanism are triangular with an arc shaped bottom edge, and the support pin 33 is provided above the rear end section of the long holes 19*a* for telescopic mechanism. As a result, it is possible to suppress the amount that the pivoting friction plates 25*d* for telescopic mechanism protrude from the edge on the bottom end of the held plate sections 27 and from the front edge on the front end of the outer column 13*a*, and thus it is possible to make the steering apparatus more compact.

Moreover, in this example, the angle $\kappa$ between the tangential direction of the portions of the long guide holes 32*c* that the adjustment rod 22*a* engages with and the connecting line between the adjustment rod 22*a* and the support pins 33 is large in some extent (approximately 60° in the figure). Furthermore, the angle $\lambda$ between the direction of the normal line to the portion of the long guide holes 32*c* that the adjustment rod 22*a* engages with and the lengthwise direction of the long holes 19*a* for telescopic mechanism can also be large in some extent (approximately 75° in the figure). Preferably these angles κ and λ are made as large as possible in order to improve the holding force in the forward-backward direction of the holding force by which the support bracket 12a holds the outer column 13a. However, when at least one of these angle κ or λ is 90° or greater and when the forward-backward position of the steering wheel 1 (see FIG. 41) is adjusted, the pivoting friction plates 25d for telescopic mechanism are not able to pivot and displace around the support pins 33. Taking this into consideration, preferably these angles κ and λ are between 50° and 80°, and more preferably between 60° and 70°.

In this example, when the friction coefficient of the surfaces on both sides of the pivoting friction plates 25d for telescopic mechanism becomes large (the friction coefficient is 0.15 or greater) due to the surface area of the friction surfaces becoming large, there is a possibility that the following problems may occur. In other words, the adjustment handle 23 is turned in a specified direction, the space between the adjustment nut 29 and the head section 30a of the adjustment rod 22a is expanded and the surface pressure at the engaging section between the inner circumferential surface of the front end section of the outer column 13a and the outer circumferential surface of the rear end section of the inner column 14a decreases or is lost. In this state, when adjusting the forward-backward position of the outer column 13a and when the friction resistance of the surfaces on both sides of the pivoting friction plates 25d for telescopic mechanism is large, it becomes difficult for the pivoting friction plates 25d for telescopic mechanism to pivot and displace, so there is a possibility that it will be difficult to adjust the forward-backward position of the outer column 13a. In this example, in order to suppress the friction coefficient (less than 0.15) of all or part of the surfaces on both sides of the pivoting friction plates 25d for telescopic mechanism, a lubricating film is formed using a solid lubricant such as molybdenum disulfide, fluororesin or DLC (diamond-like carbon). Therefore, regardless of the forward-backward position of the outer column 13a, it is possible to smoothly adjust the forward-backward position of the outer column 13a after the adjustment handle 23 has been turned in a specified direction, even when the angles κ and λ are large to some extent. However, in case that the angles κ and λ are less than 50°, it is preferred that the friction coefficient of the pivoting friction plates 25d for telescopic mechanism is 0.15 or greater. The construction and effects of the other parts of this example are the same as in the tenth example.

Example 13

Figure 27:
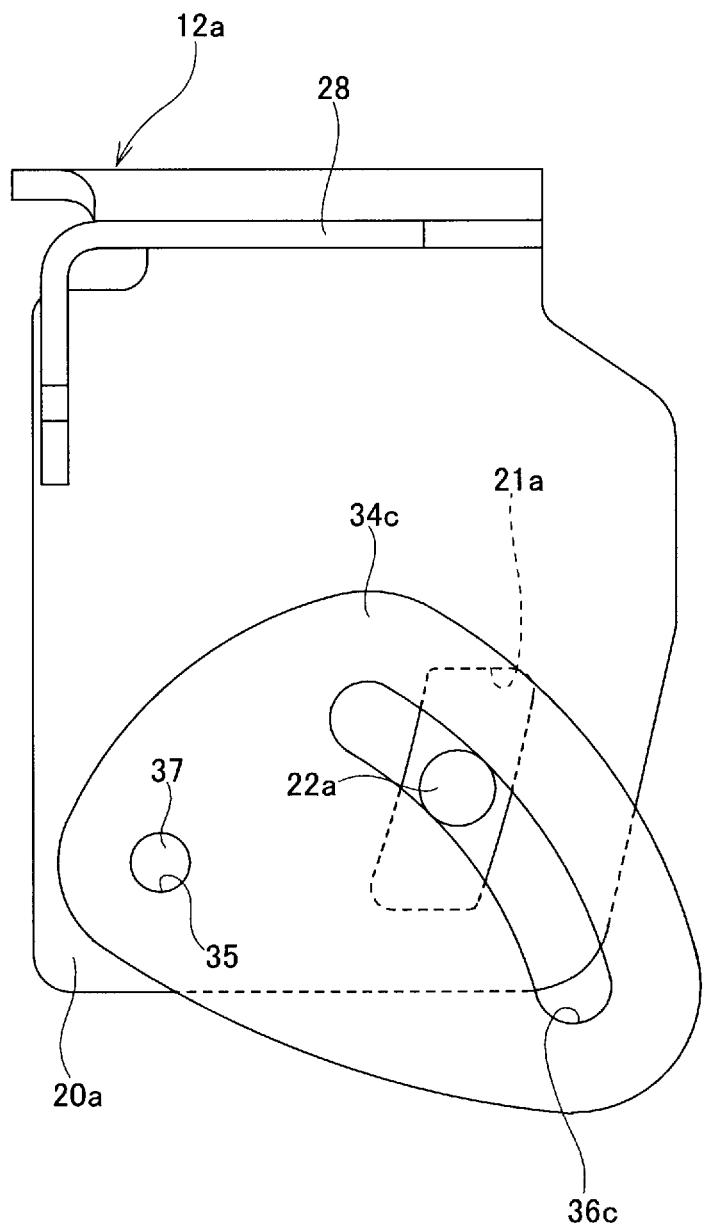
FIG. 27 illustrates a thirteenth example of an embodiment of the present invention, and is a drawing similar to FIG. 4, and illustrates a state in which the adjustment rod is located in the middle section of the long holes for tilt mechanism, with part of the members omitted.

FIG. 27 illustrates a thirteenth example of an embodiment of the present invention. In this example, the pivoting friction plates 34c for tilt mechanism are triangular, and the support pins 33 are provided in front of the bottom end sections of the support plate sections 20a. As a result, the surface area of the pivoting friction plates 34c for tilt mechanism that come in contact with the support plate sections 20a becomes large, and thus the holding force by which the support bracket 12a holds the outer column 13a becomes large. Moreover, by making the long guide holes 36c an arc shape, pivotal displacement of the pivoting friction plates 34c for tilt mechanism is smooth, and it becomes difficult for the adjustment rod 22a to displace along the long guide holes 36c during a secondary collision. The construction and effects of the other parts of this example are the same as in the second example of the embodiment.

Example 14

Figure 28:
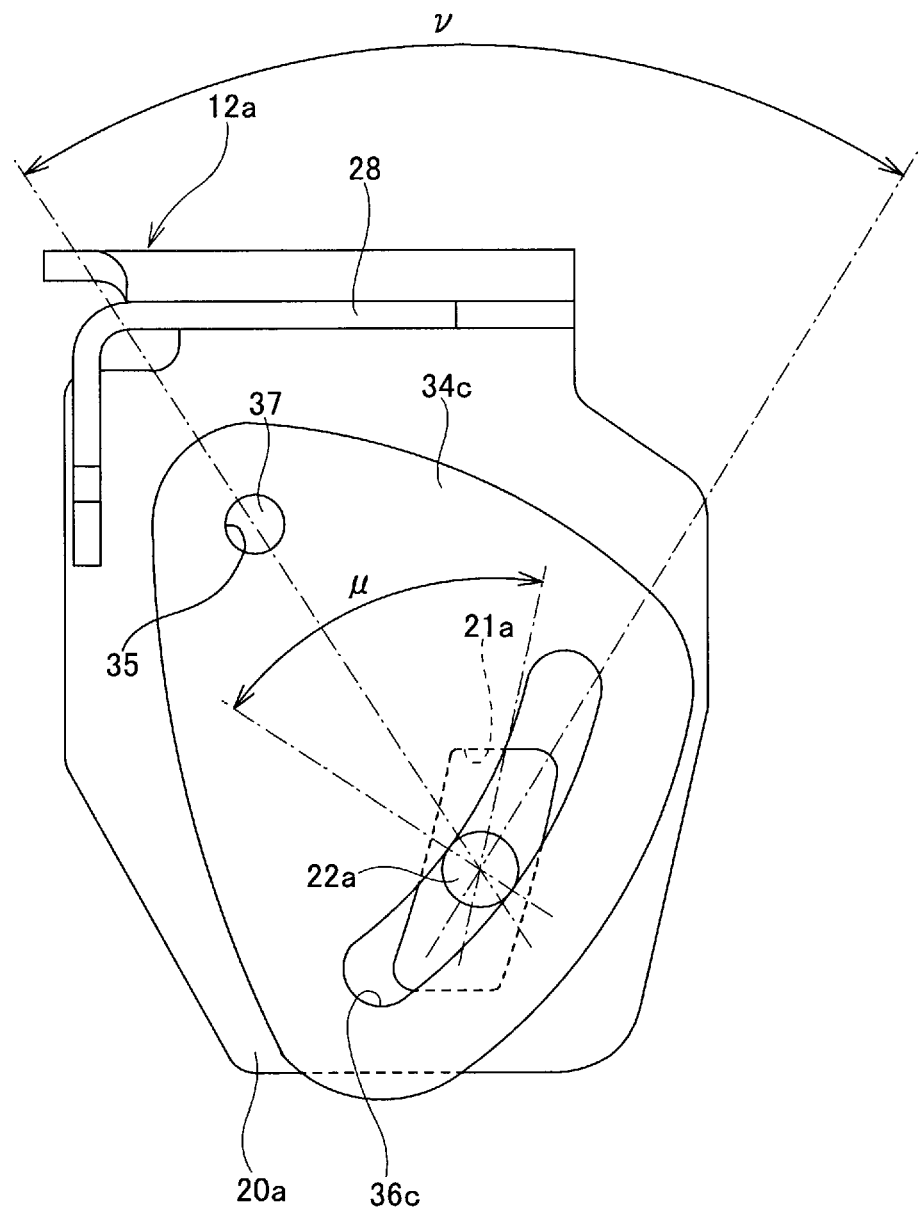
FIG. 28 illustrates a fourteenth example of an embodiment of the present invention, and is a drawing similar to FIG. 4, and illustrates a state in which the adjustment rod is located in the middle section of the long holes for tilt mechanism, with part of the members omitted.
Figure 29:
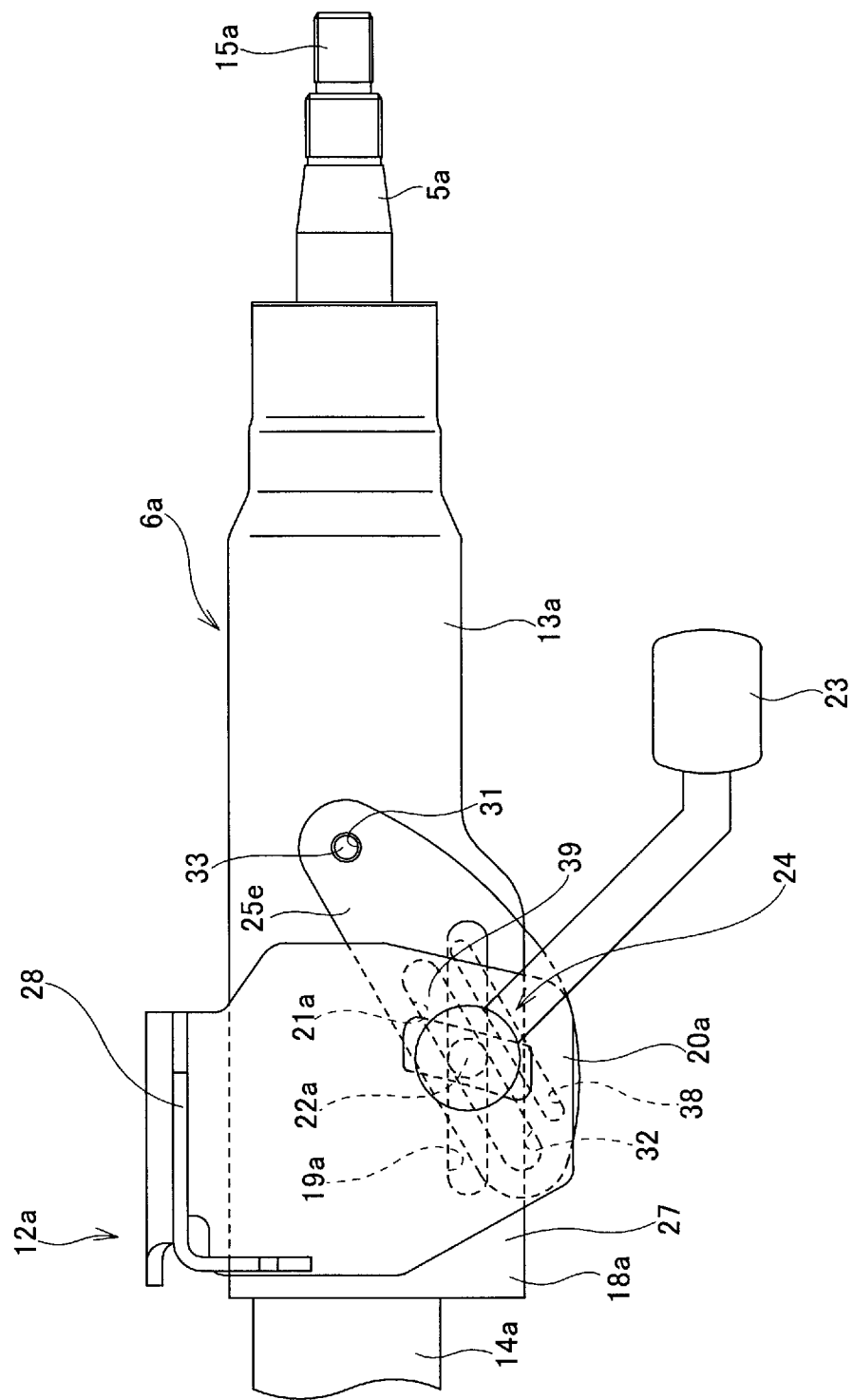
FIG. 29 is a drawing similar to FIG. 2A, and illustrates a fifteenth example of an embodiment of the present invention.
Figure 30:
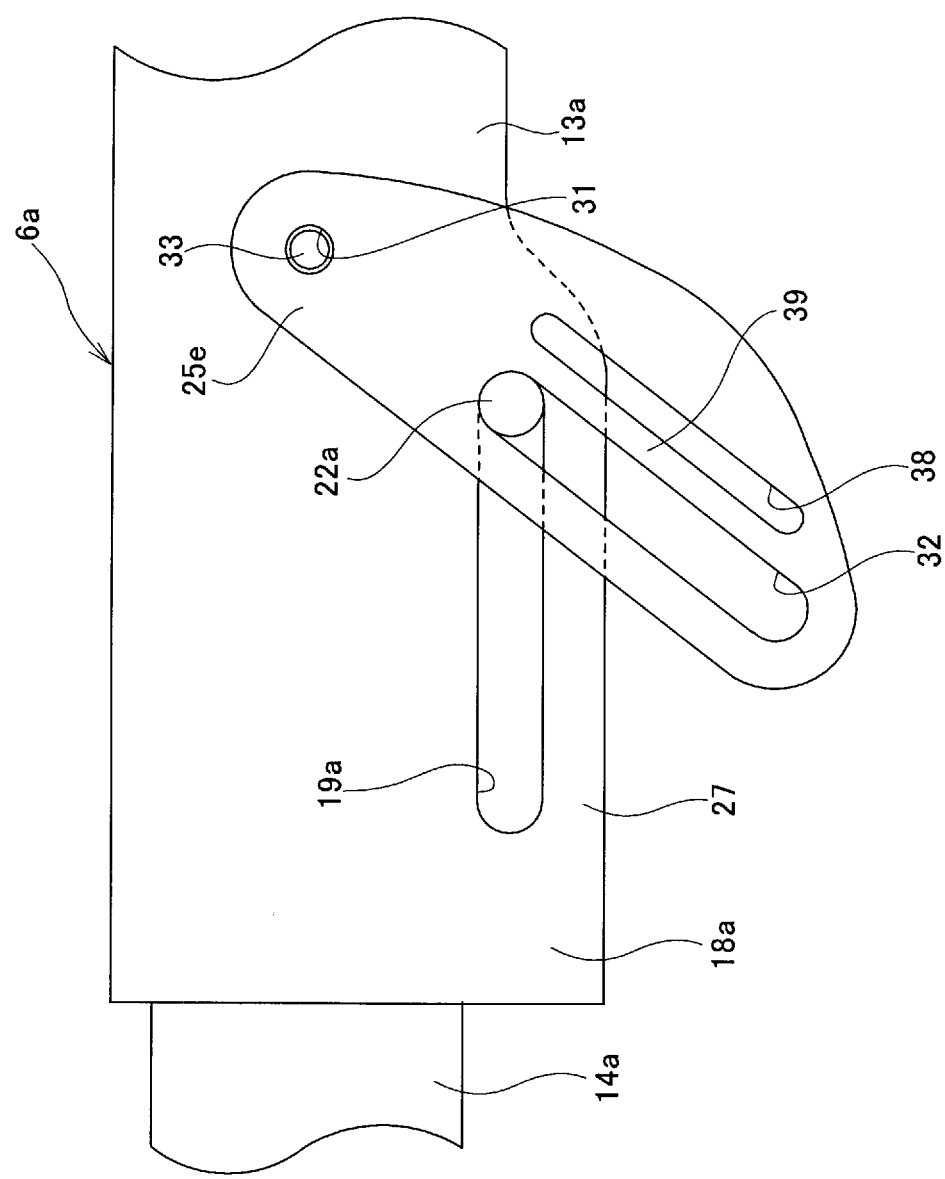
FIG. 30 is a drawing that corresponds to the left half in FIG. 29, and illustrates a state in which the adjustment rod is located in the rear end section of the long holes for telescopic mechanism, with part of the members omitted.
Figure 31:
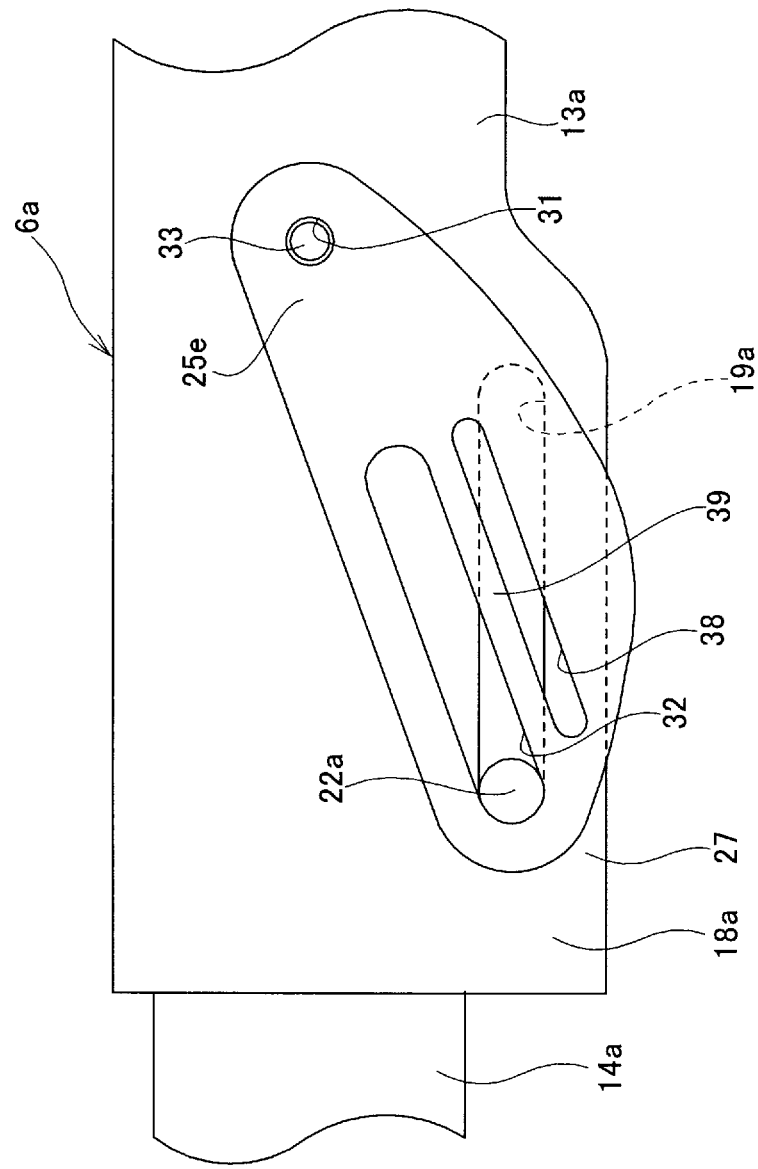
FIG. 31 is a drawing similar to FIG. 30, and illustrates a state in which the adjustment rod is located in the front end section of the long holes for telescopic mechanism.
Figure 32:
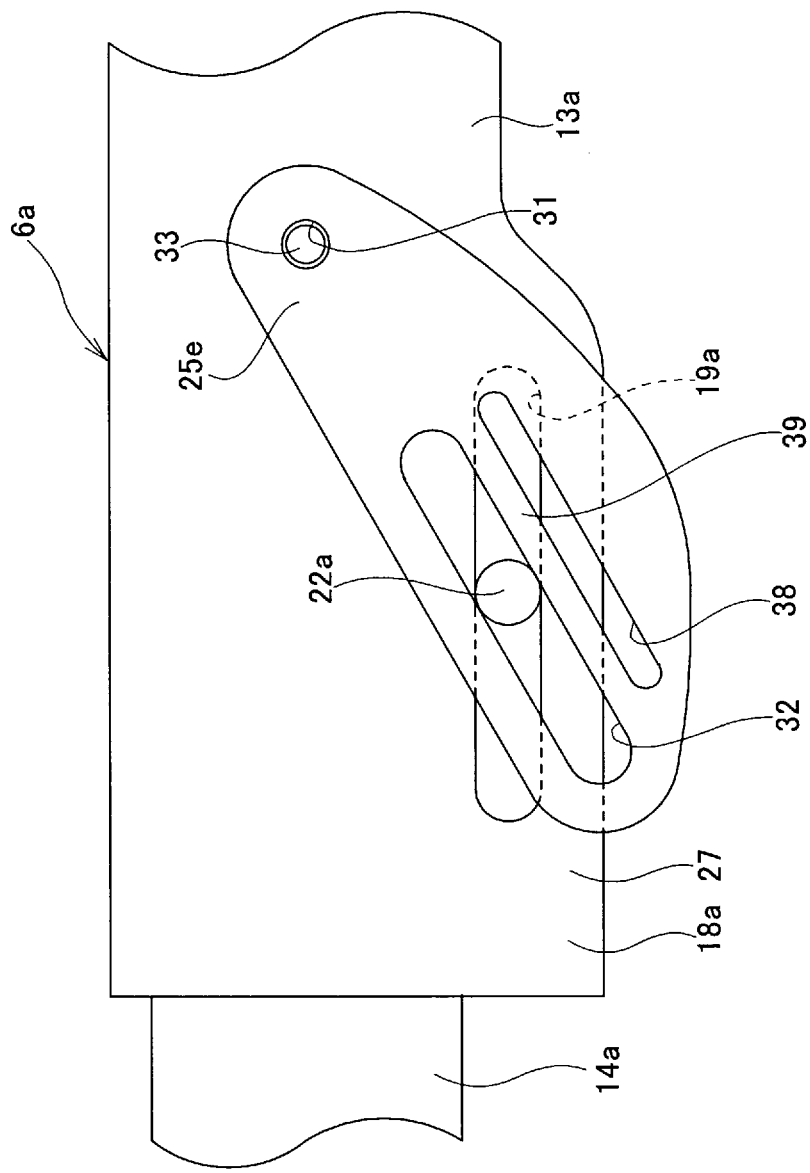
FIG. 32 is a drawing similar to FIG. 30, and illustrates a state in which the adjustment rod is located in the middle section of the long holes for telescopic mechanism.

FIG. 28 illustrates a fourteenth example of an embodiment of the present invention. In this example as well, as in the thirteenth example of the embodiment, the pivoting friction plates 34c for tilt mechanism are triangular, and the long guide holes 36c have an arc shape, however, differing from the thirteenth example, the support pins 37 are provided in front of and above the support plate sections 20a.

In this example, the angle μ between the tangential direction of the portions of the long holes 21a for tilt mechanism that the adjustment rod 22a engages with and the direction of the normal line to the portions of the long guide holes 36c that the adjustment rod 22a engages with can be large to some extent (approximately 70° in the figure). Moreover, the angle ν between the tangential direction of the portions of the long guide holes 36c that the adjustment rod 22a engages with and the connecting line between the adjustment rod 22a and the support pin 37 can be large to some extent (approximately 65° in the figure). Preferably, in order to improve the holding force by which the support bracket 12a holds the outer column 13a, the angles μ and ν are made as large as possible. However, when one of the angles μ or ν is 90° or greater, it becomes impossible for the pivoting friction plates 34c for tilt mechanism to pivot and displace around the support pins 37 when adjusting the up-down position of the steering wheel 1 (see FIG. 41). Taking this into consideration, it is preferred that the angles μ and ν be between 50° and 80°, and more preferably between 60° and 70°, regardless of the up-down position of the outer column 13a.

In this case, when the friction coefficient of the surfaces on both sides of the pivoting friction plates 34c for tilt mechanism is large (friction coefficient is 0.15 or greater), there is a possibility that the following problems could occur. In other words, the adjustment handle 23 is turned in a specified direction, the space between the adjustment nut 29 and the head section 30a of the adjustment rod 22a is expanded, and the surface pressure at the engaging section between the inner circumferential surface of the front end section of the outer column 13a and the outer circumferential surface of the rear end section of the inner column 14a decreases or is lost. In this state, when adjusting the up-down position of the outer column 13a and when the friction resistance of the surfaces on both sides of the pivoting friction plates 34c for tilt mechanism is large, it becomes difficult for the pivoting friction plates 34c for tilt mechanism to pivot and displace, and there is a possibility that it will become difficult to adjust the up-down position of the outer column 13a. In this example, in order to suppress the friction coefficient (less than 0.15) of all or part of the surfaces on both sides of the pivoting friction plates 34c for tilt mechanism, a lubricating film is formed using a solid lubricant such as molybdenum disulfide, fluororesin or DLC (diamond-like carbon). Therefore, regardless of the forward-backward position of the outer column 13a, it is possible to smoothly adjust the up-down position of the outer column 13a after the adjustment handle 23 has been turned in a specified direction, even when the angles μ and ν are large to some extent. However, if the angles μ and ν are less than 50°, it is preferred that the friction coefficient of the pivoting friction plates 34c for tilt mechanism be 0.15 or greater. The construction and effects of the other parts of this example are the same as in the tenth example.

Example 15

FIG. 29 to FIG. 33 illustrate a fifteenth example of an embodiment of the present invention. In this example, the pivoting friction plates 25e for telescopic mechanism are triangular, and together with further increasing the surface area, straight long guide holes 32e are formed in the pivoting friction plates 25e for telescopic mechanism. Moreover, long strength adjustment holes 38 that are parallel with the long guide holes 32e are formed in the portions of the pivoting friction plates 25e for telescopic mechanism that are separated from the edges of one side in the width direction of the long guide holes 32e (edges of the bottom side in FIG. 29 to FIG. 32) of the edges of both sides in the width direction of the long guide holes 32e to which an impact load is applied from adjustment rod 22a during a secondary collision toward the one side in the width direction of the long guide holes 32e. As a result, a bridge section 39 that is capable of plastic deformation toward the long strength adjustment holes 38 due to an impact load that is applied to the edges on one side of the long guide holes 32e during a secondary collision is formed between the long guide holes 32e and the long strength adjustment holes 38.

Figure 33:
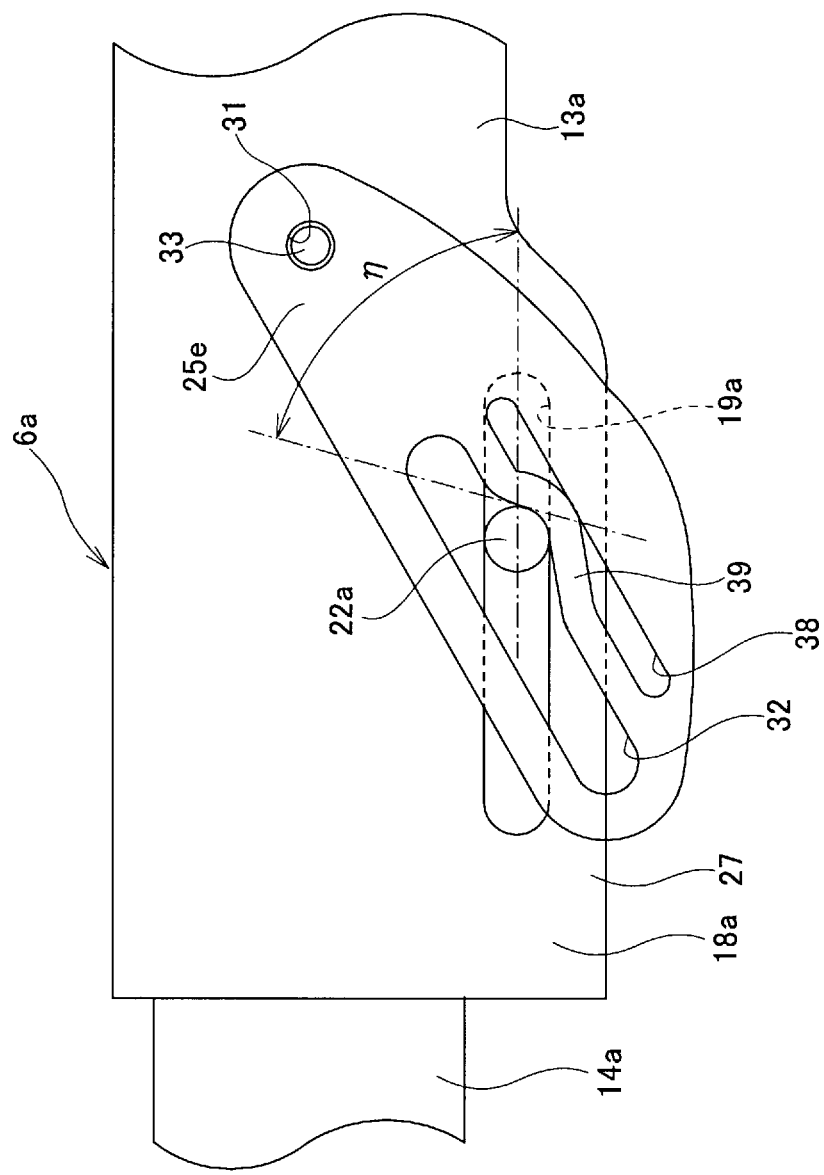
FIG. 33 is a drawing similar to FIG. 32, and illustrates the state after a secondary collision occurs.

In this example, as illustrated in FIG. 33, during a secondary collision, as the bridge sections 39 are pressed by the adjustment rod 22a and plastically deform toward the long strength adjustment holes 38, the edges on one side of the long guide holes 32e deform. As a result, the angle η between the tangential direction of the portions of the edges on one side of the long guide holes 32e that the adjustment rod 22a engages with and the axial direction of the outer column 13a increases. Consequently, it is possible to make it difficult for the adjustment rod 22a to displace along the long holes 19a for telescopic mechanism. Therefore, it is possible to further increase the holding force by which the support bracket 12a holds the outer column 13a during a secondary collision. The construction and effects of the other parts of this example are the same as in the first example of the embodiment.

Example 16

Figure 34:
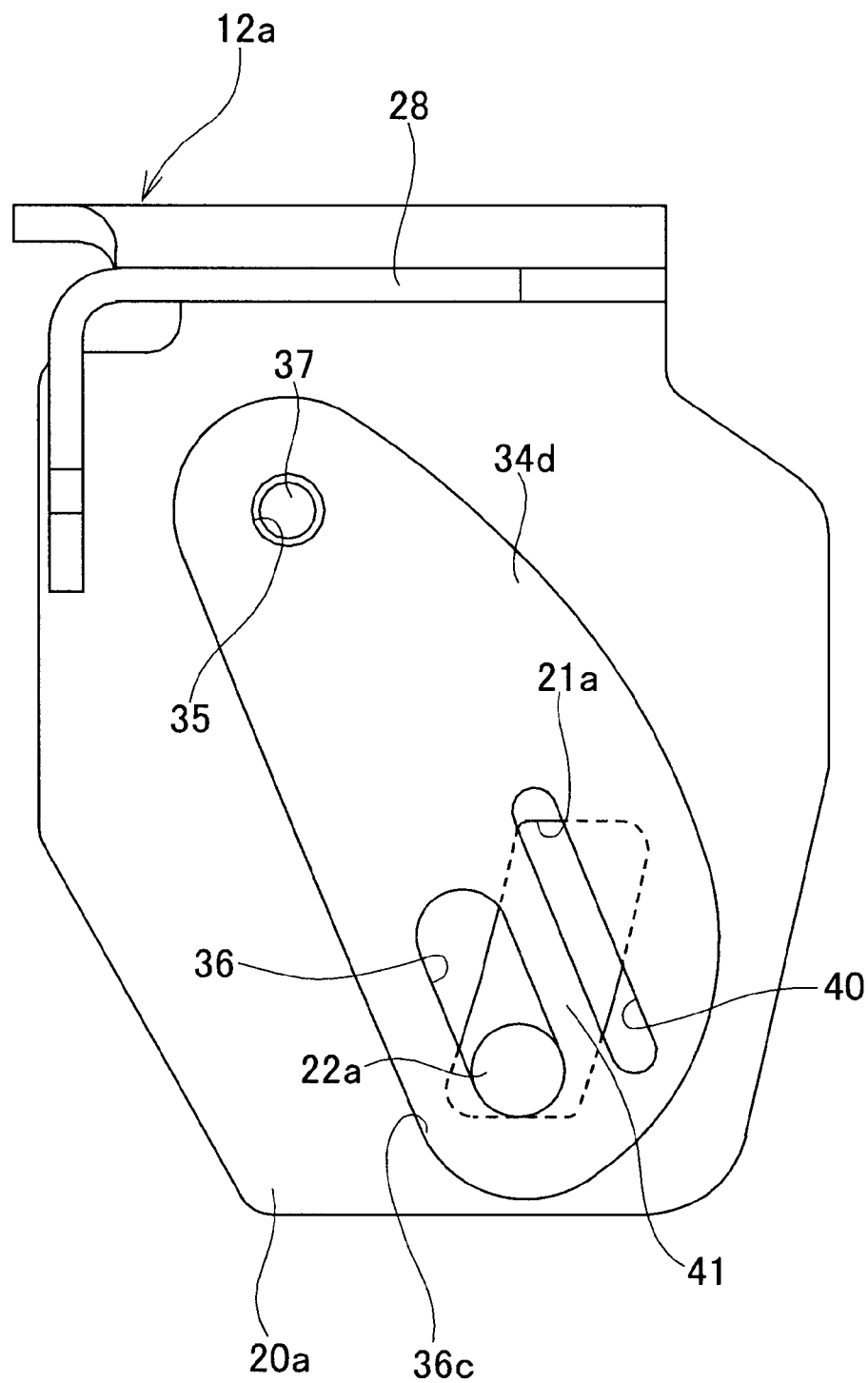
FIG. 34 illustrates a sixteenth example of an embodiment of the present invention, and is a drawing similar to FIG. 4, and illustrates a state in which the adjustment rod is located in the bottom end section of the long holes for tilt mechanism.
Figure 35:
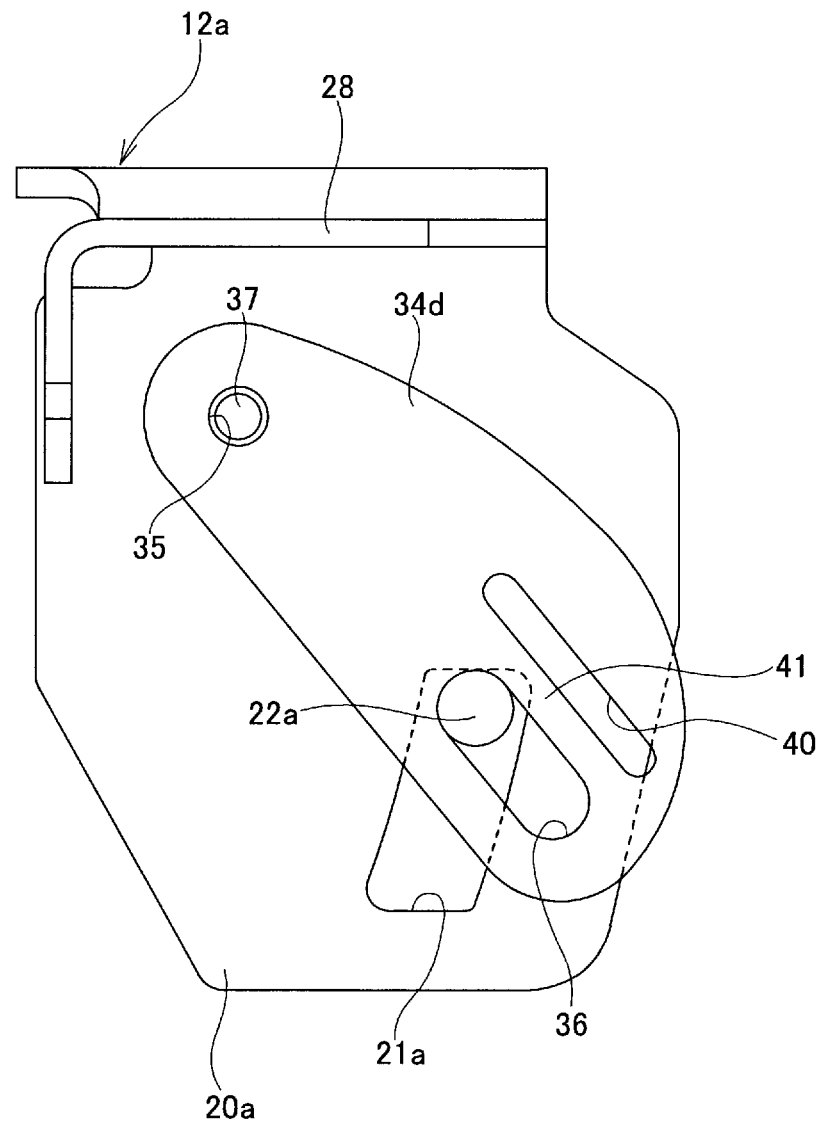
FIG. 35 is a drawing similar to FIG. 34, and illustrates a state in which the adjustment rod is located in the top end section of the long holes for tilt mechanism, with part of the members omitted.
Figure 36:
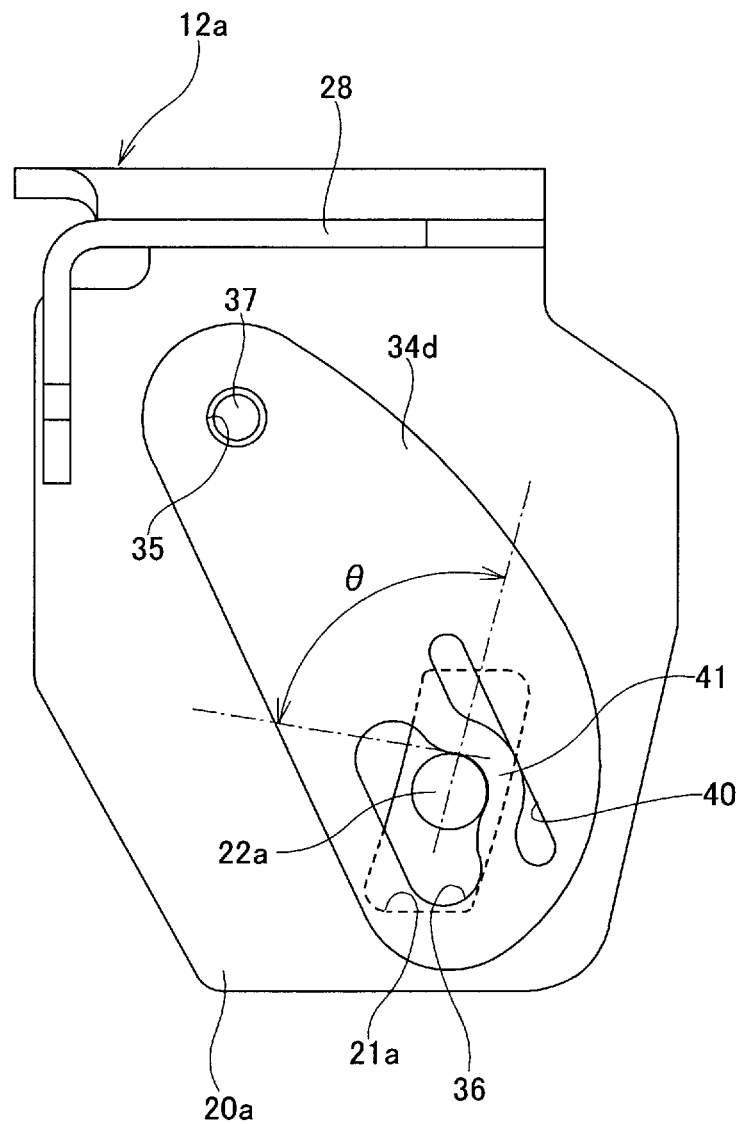
FIG. 36 is a drawing similar to FIG. 34, and illustrates a state in which the adjustment rod is located in the middle section of the long holes for tilt mechanism after a secondary collision has occurred.

FIG. 34 to FIG. 36 illustrate a sixteenth example of an embodiment of the present invention. In this example, the edges of one side of the edges on both sides in the width direction of the pivoting friction plates 34d for tilt mechanism is arc shaped, and together with further increasing the surface area, straight long guide holes 36d are provided in the pivoting friction plates 34d for tilt mechanism. Moreover, long strength adjustment holes 40 that are parallel with the long guide holes 36d are formed in portions of the pivoting friction plates 34d for tilt mechanism that are separated from the edges of one side (edges on the top side in FIG. 34 to FIG. 36) to which an impact load is applied from the adjustment rod 22a during a secondary collision of the edges of both sides in the width direction of the long guide holes 36d toward the one side in the width direction of the long guide holes 36d. As a result, bridge sections 41 that are capable of plastic deformation toward the long strength adjustment holes 40 are provided between the long guide holes 36d and the long strength adjustment holes 40.

In this example, as illustrated in FIG. 36, during a secondary collision, as the bridge sections 41 are pressed by the adjustment rod 22a and plastically deform toward the long strength adjustment holes 40, the edges on one side of the long guide holes deform. As a result, the angle θ between the tangential direction of the portions of the edges on one side of the long guide holes 36d that the adjustment rod 22a engages with and the tangential direction of the portions of the long holes 21a for tilt mechanism that the adjustment rod 22a engages with increases. Consequently, it becomes difficult for the adjustment rod 22a to displace along the long holes 21a for tilt mechanism. Therefore, it is possible to further increase the holding force by which support bracket 12a holds the outer column 13a during a secondary collision. The construction and effects of the other parts of this example are the same as in the second example of the embodiment.

Example 17

Figure 37:
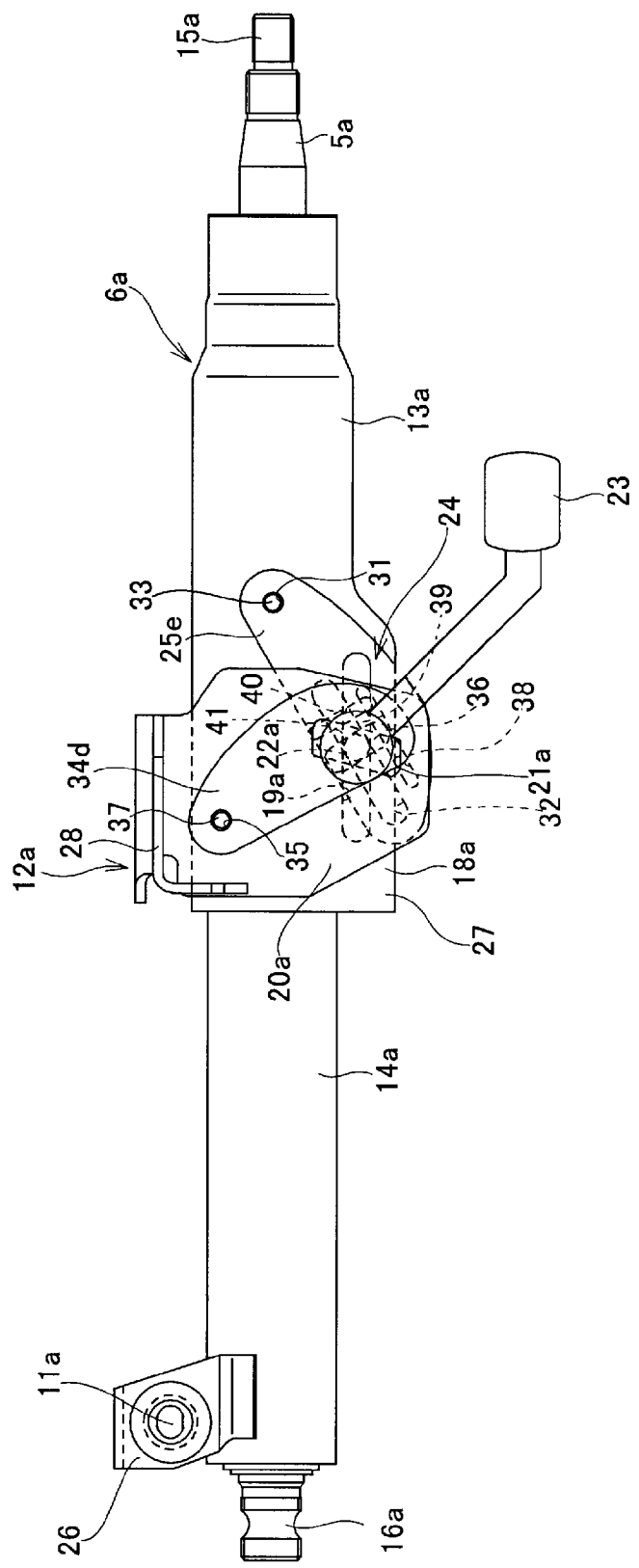
FIG. 37 is a drawing similar to FIG. 1, and illustrates a seventeenth example of an embodiment of the present invention.

FIG. 37 illustrates a seventeenth example of an embodiment of the present invention. This example has the construction that combines the fifteenth and sixteenth examples. In other words, bridge sections 39 are formed by forming long strength adjustment holes 38 in the pivoting friction plates 25e for telescopic mechanism, and bridge sections 41 are formed by forming long strength adjustment holes 40 in the pivoting friction plates 34d for tilt mechanism. The construction and effects of the other parts of this example are the same as in the fifteenth and sixteenth examples of the embodiment.

Example 18

Figure 38:
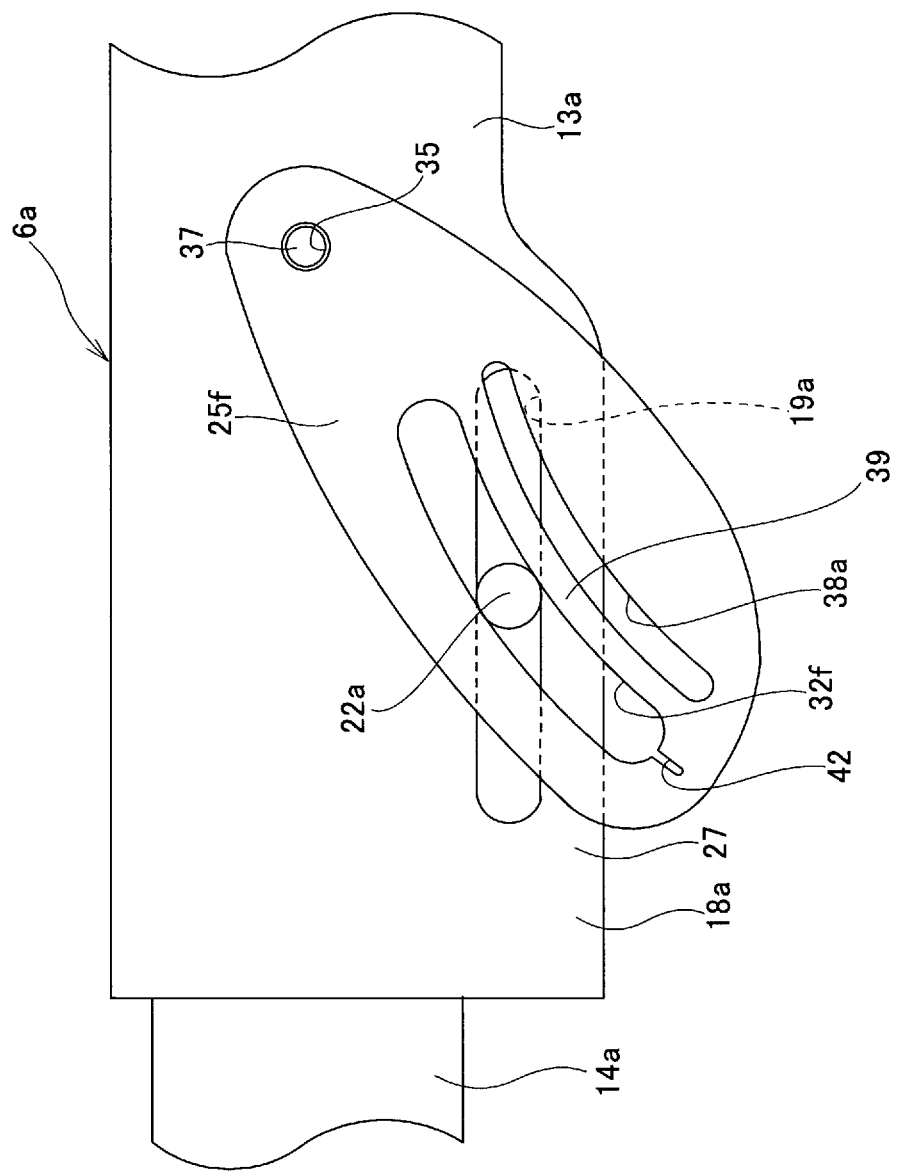
FIG. 38 illustrates an eighteenth example of an embodiment of the present invention, and is a drawing similar to FIG. 4, and illustrates a state in which the adjustment rod is located in the middle section of the long holes for telescopic mechanism, with part of the members omitted.
Figure 39:
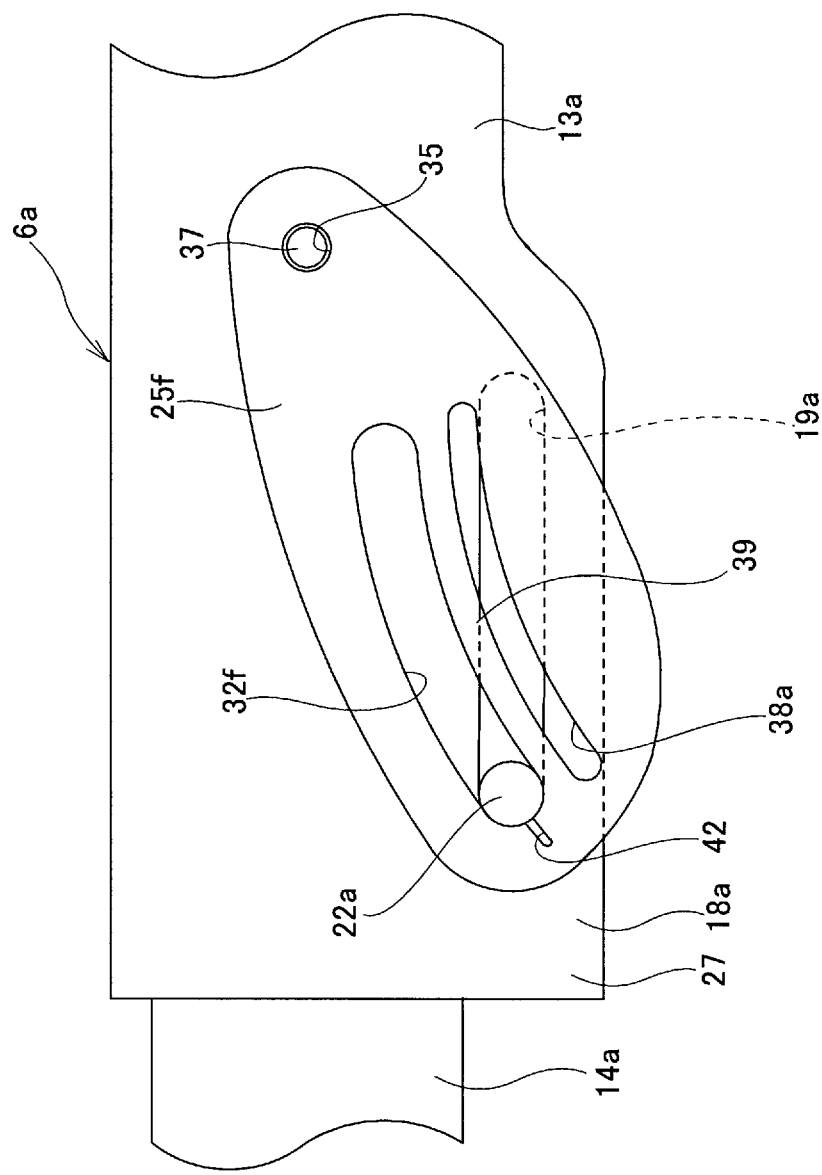
FIG. 39 is a drawing similar to FIG. 38, and illustrates a state in which the adjustment rod is located in the front end section of the long holes for telescopic mechanism.

FIG. 38 and FIG. 39 illustrate an eighteenth example of an embodiment of the present invention. In this example, arc shaped long guide holes 32f are provided in the pivoting friction plate 25f for telescopic mechanism. Moreover, by providing long guide holes 32f and arc shaped long strength adjustment holes 38a, arc shaped bridge sections 39a that are capable of plastically deforming during a secondary collision are formed in part of the pivoting friction plates 25f for telescopic mechanism. Furthermore, notch sections 42 are formed in the edges of one of the ends (edges on the bottom ends in FIG. 38) in the lengthwise direction of the long guide holes 32f where stress is concentrated due to an impact load that is applied from the adjustment rod 22a during a secondary collision. By providing these notch sections 42, it becomes easier for the bridge sections 39 to deform during a secondary collision. The construction and effects of the other parts of this example are the same as in the fifteenth example.

Example 19

Figure 40:
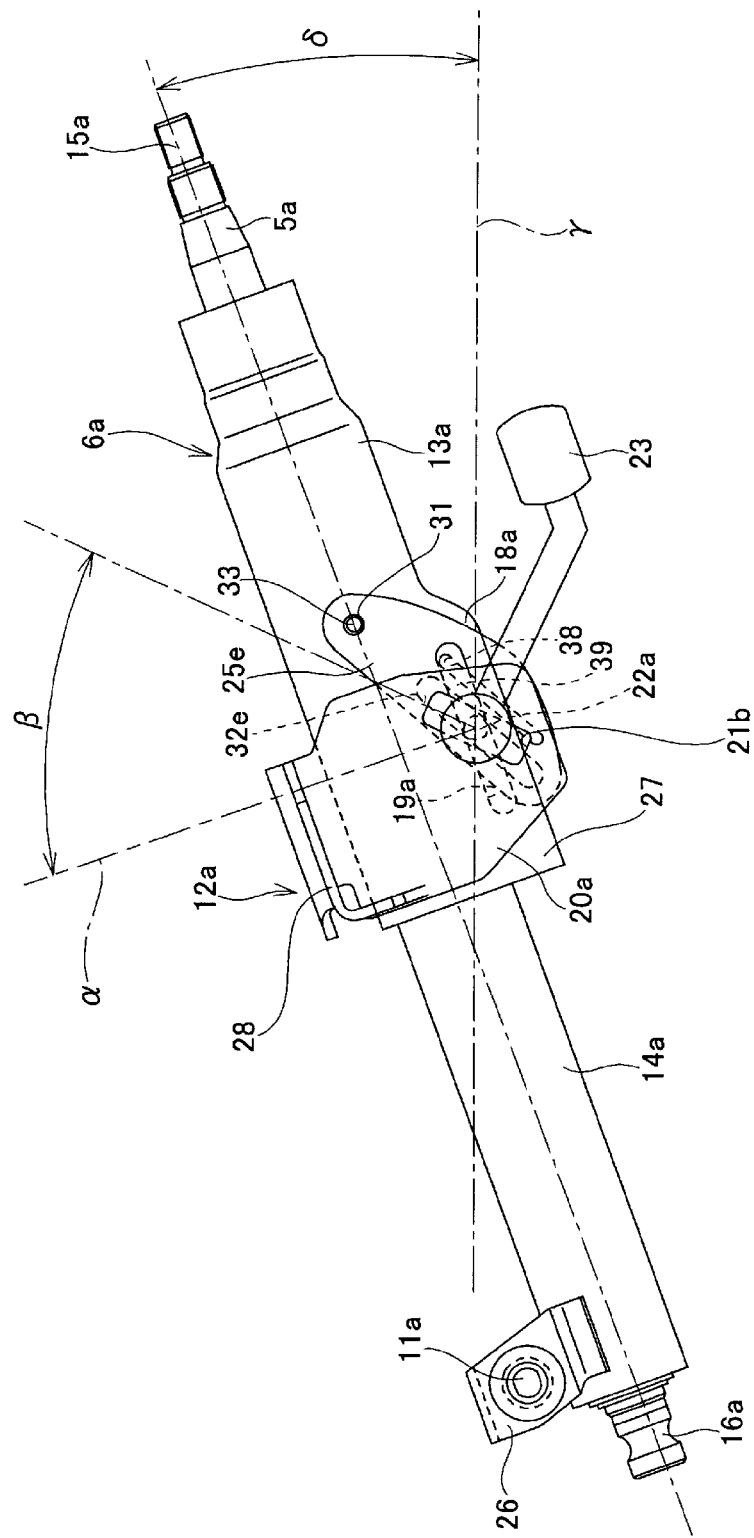
FIG. 40 is a drawing similar to FIG. 1, and illustrates a nineteenth example of an embodiment of the present invention.

FIG. 40 illustrates a nineteenth example of an embodiment of the present invention. This example has construction that combines the fifth example and fifteenth example. In other words, the inclination angle 13 of the long holes for tilt mechanism 21b with respect to an virtual plane a that is orthogonal to the center axis of the steering column 6a is greater than the inclination angle δ of the center axis of the steering column 6a with respect to the forward-backward direction γ regardless of the up-down position of the steering wheel 1 (see FIG. 41), and by providing long strength adjustment holes 38 in the pivoting friction plates 25e for telescopic mechanism, bridge sections 39 are formed. The construction and effects of the other parts of this example are the same as in the fifth example and fifteenth example.

In the embodiment of the present invention described above, construction wherein pivoting friction plates for telescopic mechanism or pivoting friction plates for tilt mechanism are arranged such that there is one plate on both the left side and right side of the steering column, or construction wherein a combination of pivoting friction plates for telescopic mechanism and pivoting friction plates for tilt mechanism are arranged such that there is one plate of each on both the left side and right side of the steering column is employed, however, when embodying the present invention, it is also possible to employ construction wherein there is a pivoting friction plate for telescopic mechanism or a pivoting friction plate for tilt mechanism or a combination of these on only one side, the left or right side, of the steering column.

Moreover, when embodying the present invention, in order that the pivoting friction plates can pivot smoothly around the support pins when adjusting the position of the steering wheel, it is possible to form a resin coating layer on the outer circumferential surface of the adjustment rod that engages with the long guide holes, or it is also possible to fit a cylindrical collar or bearing around the outside of the adjustment rod.

INDUSTRIAL APPLICABILITY

The present invention can be applied to a steering apparatus for an automobile that comprise a tilt and telescopic mechanism, or to a steering apparatus that comprises either a tilt mechanism or a telescoping mechanism.

EXPLANATION OF REFERENCE NUMBERS

1 Steering wheel
2 Steering gear unit
3. Input shaft
4 Tie rod
5, 5a Steering shaft
6, 6a Steering column
7 Universal joint
8 Intermediate shaft
9 Universal joint
10 Vehicle body
11, 11a Pivot shaft
12, 12a Support Bracket
13, 13a Outer column
14, 14a Inner column
15, 15a Outer shaft
16, 16a Inner shaft
17 Electric motor
18, 18a Displacement bracket
19, 19a Long hole for telescopic mechanism
20, 20a Support plate section
21, 21a Long hole for tilt mechanism
22, 22a Adjustment rod
23 Adjustment handle
24 Expansion and contraction apparatus
25, 25a to 25f Pivoting friction plate for telescopic mechanism
26 Pivotal support bracket
27 Held plate section
28 Installation plate section
29 Adjustment nut
30 Head section
31 Pivot hole
32, 32a to 32f Long guide hole
33 Support pin
34, 34a to 34e Pivoting friction plate for tilt mechanism
35 Pivot hole
36, 36a to 36e Long guide hole
37 Support pin
38 Long strength adjustment hole
39 Bridge section
40 Long strength adjustment hole
41 Bridge section
42 Head section

What is claimed is:

1. A steering apparatus comprising:
a steering column located around a steering shaft with a steering wheel fastened to a rear end section of the steering shaft, the steering column rotatably supporting the steering shaft;
a displacement bracket fastened to a middle section in an axial direction of the steering column;
a first through hole formed in a left-right direction in the displacement bracket;
a support bracket supported by a vehicle, and having a pair of support plate sections provided on the left side and the right side of the displacement bracket;
a plurality of second through holes, each second through hole formed in part of each support plate section of the pair of support plate sections at positions that are aligned with another second through hole;
an expansion and contraction apparatus, the apparatus comprising
an adjustment rod;
an adjustment handle provided on a portion of one end section of the adjustment rod, the portion being protruded from one of outside surfaces of the pair of support plate sections; and
a pair of pressing sections provided on parts of the adjustment rod at positions on both the left surface side and right surface side of the pair of support plate sections,
the expansion and contraction apparatus expanding or contracting a space between the pair of pressing sections based on an operation of the adjustment handle;
a pivoting friction plate held in at least one of portions located between a pair of surfaces that face each other, which comprise portions located between inside surfaces of the pair of the support plate sections and outside surfaces of the both the left side and the right side of the displacement bracket and between the outside surfaces of the pair of the support plate sections and inside surfaces of the pair of the pressing sections, and having a pivot hole and a long guide hole formed therein at two locations separated from each other; and
a support pin provided in part of one of the pair of surfaces holding the pivoting friction plate that is displaced relative to the adjustment rod when performing position adjustment of the steering wheel, or in a portion that does not move with respect to the one of the pair of surfaces, the support pin engaging with the pivot hole, wherein
the first through hole is a long hole for telescopic mechanism that extend in the axial direction of the steering column, and the adjustment rod is inserted through the long hole for telescopic mechanism, the second through holes and the long guide hole,
when surface pressure at areas of contact between surfaces on both left and right sides of the pivoting friction plate and the pair of surfaces holding the pivoting friction plate is decreased or lost by expanding the space between the pair of pressing sections, and when the adjustment rod is displaced along the long hole for telescopic mechanism, the pivoting friction plate that is held between the at least one of portions between a pair of surfaces pivots around the support pin as the adjustment rod is displaced along the long guide hole, and
over entire pivoting range of the pivoting friction plate, a lengthwise direction of the long guide hole or a tangential direction of a portion of the long guide hole where the adjustment rod engages with the long guide hole does not coincide with a lengthwise direction of the long hole for telescopic mechanism.

2. The steering apparatus according to claim 1, wherein the pivoting friction plate is made of different metallic material in hardness from at least one of a member that comprises the one of the pair of surfaces holding the pivoting friction plate and a member that comprises another surface of the pair of surfaces.

3. The steering apparatus according to claim 1, wherein the pivoting friction plate is formed using iron, an iron alloy, aluminum or an aluminum alloy.

* * * * *